United States Patent
Choi et al.

(10) Patent No.: US 11,218,082 B2
(45) Date of Patent: Jan. 4, 2022

(54) ELECTRONIC DEVICE AND POWER SUPPLY

(71) Applicant: SAMSUNG ELECTRONICS CO., LTD., Suwon-si (KR)

(72) Inventors: Youngho Choi, Suwon-si (KR);
Youngsoo Kim, Suwon-si (KR);
Youngnam Yoon, Suwon-si (KR);
Sung-Bum Jung, Suwon-si (KR);
Shinwook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/930,634

(22) Filed: Jul. 16, 2020

(65) Prior Publication Data
US 2021/0021207 A1 Jan. 21, 2021

(30) Foreign Application Priority Data
Jul. 19, 2019 (KR) .................. 10-2019-0087315

(51) Int. Cl.
*H02M 3/335* (2006.01)
*H02M 7/219* (2006.01)
*H02M 7/217* (2006.01)
*H02M 1/42* (2007.01)
*H02M 3/07* (2006.01)

(52) U.S. Cl.
CPC ......... *H02M 7/219* (2013.01); *H02M 1/4208* (2013.01); *H02M 3/33507* (2013.01); *H02M 3/33576* (2013.01); *H02M 7/2176* (2013.01)

(58) Field of Classification Search
CPC ............... H02M 3/335; H02M 3/3307; H02M 3/33569; H02M 3/33571; H02M 3/33573; H02M 3/33576; H02M 3/33592; H02M 3/07; H02M 7/219; H02M 7/2176
See application file for complete search history.

(56) References Cited

U.S. PATENT DOCUMENTS

2009/0129123 A1\* 5/2009 Taurand ............ H02M 3/33576
363/17
2019/0068069 A1\* 2/2019 Sheng ............... H02M 3/33576

\* cited by examiner

*Primary Examiner* — Gary L Laxton
(74) *Attorney, Agent, or Firm* — Sughrue Mion, PLLC

(57) ABSTRACT

A power supply is provided. The power supply includes: a switching module including switching elements and is configured to receive rectified power; a transformer configured to transform first power received from the switching module; an outputter including first and second switching elements, and is configured to receive the transformed first power from the transformer and output an output voltage that follows a preset reference voltage; and a controller configured to control the switching module to operate in a full bridge mode or a half bridge module based on a peak voltage of the rectified power, adjust a switching frequency of the switching module based on the output voltage, control switching of the first and second switching elements based on the output voltage, and adjust a duty ratio of each of the first and second switching elements based on the rectified power.

20 Claims, 16 Drawing Sheets

ELECTRONIC DEVICE AND POWER SUPPLY

CROSS-REFERENCE TO RELATED APPLICATION

This application is based on and claims priority under 35 U.S.C. § 119 to Korean Patent Application No. 10-2019-0087315, filed on Jul. 19, 2019, in the Korean Intellectual Property Office, the disclosure of which is incorporated herein by reference in its entirety.

BACKGROUND

1. Field

The disclosure relates to a power supply for boosting a voltage while correcting a power factor, and an electronic device having the same.

2. Description of Related Art

In general, a power supply includes a separate circuit configuration for correcting a power factor to prevent reactive power generated according to a phase difference between voltage and current.

For example, the power supply may include a separate circuit configuration for correcting a power factor in a converter that converts AC power into DC power.

In this case, the circuit configuration for correcting the power factor requires a plurality of elements, for example, a plurality of inductors, which leads to an increase in the volume of the power supply, and an increase in the material cost. In addition, due to operation of the plurality of elements, excess heat may be generated in the power supply.

SUMMARY

Provided are a power supply capable of providing a converter with a power factor correction function without including a separate circuit configuration, and an electronic device having the same.

Embodiments of the disclosure overcome the above disadvantages and other disadvantages not described above. Also, the disclosure is not required to overcome the disadvantages described above, and an embodiment of the disclosure may not overcome any of the problems described above. Additional aspects of the disclosure will be set forth in part in the description which follows and additional aspects will be apparent from the description, or may be learned by practice of the disclosure.

In accordance with an aspect of the disclosure, a power supply includes: a switching module which includes a plurality of switching elements and is configured to receive rectified power; a transformer configured to receive first power from the switching module and transform the first power; an outputter which includes a first switching element and a second switching element, and is configured to receive the transformed first power from the transformer and output an output voltage that follows a preset reference voltage; and a controller configured to control the switching module to operate in one from among a full bridge mode and a half bridge module based on a peak voltage of the rectified power, adjust a switching frequency of the switching module based on the output voltage, control switching of each of the first switching element and the second switching element based on the output voltage, and adjust a duty ratio of each of the first switching element and the second switching element based on the rectified power.

The controller may be further configured to reduce the duty ratio to shorten a time in which both the first switching element and the second switching element are at an On-state based on a level of voltage of the rectified power increasing over time, and increase the duty ratio to lengthen the time in which both the first switching element and the second switching element are at an On-state based on the level of the voltage of the rectified power decreasing over time.

The controller may be further configured to increase the duty ratio to lengthen a time in which both the first switching element and the second switching element are at an On-state based on a magnitude of current of the rectified power increasing according to a state of a load, and decrease the duty ratio to shorten the time in which both the first switching element and the second switching element are at an On-state based on the magnitude of the current of the rectified power decreasing according to the state of the load.

The controller may be further configured to adjust the duty ratio of each of the first switching element and the second switching element by adding a preset offset to a difference between a current magnitude of the rectified power and a value obtained by multiplying a voltage level of the rectified power by a preset coefficient.

The transformer may include a resonance capacitor provided on a line connected between the transformer and the switching module, and the controller may be further configured to identify a resonance frequency between a leakage inductance at a side of the line connected to the switching module and the resonance capacitor as the switching frequency of the switching module.

The controller may be further configured to decrease the identified switching frequency based on the output voltage output through the outputter becoming lower than the preset reference voltage, and increase the identified switching frequency based on the output voltage output through the outputter becoming higher than the preset reference voltage.

The switching module may include a first pair of switching elements connected in series to each other and a second pair of switching elements connected in parallel with each other, the first pair of switching elements may include a third switching element and a fourth switching element, the second pair of switching elements may include a fifth switching element and a sixth switching element connected in parallel to the first pair of switching elements, and the controller may be further configured to control the third switching element and the fourth switching element such that the third switching element and the fourth switching element are alternately in an On-state based on the switching frequency of the switching module.

The controller may be further configured to control the first switching element to an On-state at a point in which the third switching element is converted from an On-state to an Off-state, and control the second switching element to an On-state at a point in which the fourth switching element is converted from an On-state to an Off-state.

The controller may be further configured to control, based on the switching module being controlled to operate in the full bridge mode, the fifth switching element to be in phase with the fourth switching element and the sixth switching element to be in phase with the third switching element, and control, based on the switching module being controlled to operate in the half bridge mode, the fifth switching element to an Off-state and the sixth switching element to an On-state.

The controller may be further configured to control, based on the level of the peak voltage of the rectified power increasing to a level exceeding a first threshold voltage, the switching module to convert from the full bridge mode to the half bridge mode, and control, based on the level of the peak voltage of the rectified power decreasing to a level below a second threshold voltage, the switching module to convert from the half bridge mode to the full bridge mode.

The controller may be further configured to control, based on the switching frequency of the switching module increasing to a level exceeding a first threshold frequency, the switching module to convert from the full bridge mode to the half bridge mode, and control, based on the switching frequency of the switching module decreasing to a level below a second threshold frequency, the switching module to convert from the half bridge mode to the full bridge mode.

The outputter may further include: a first diode that is connected to the first switching element by a first line; and a second diode that is connected to the second switching element by a second line. The first diode and the second diode may be connected in parallel, the first switching element and the second switching element may be connected in parallel, and the outputter may be connected to the transformer through a first connection point interposed between the first diode and the first switching element and a second connection point interposed between the second diode and the second switching element.

In accordance with an aspect of the disclosure, an electronic device includes: a load configured to receive power and perform an operation; and a power supply configured to supply the power to the load. The power supply includes: a switching module which includes a plurality of switching elements and is configured to receive rectified power; a transformer configured to receive first power from the switching module and transform the first power; an outputter including a first switching element and a second switching element, and configured to receive the transformed first power from the transformer and output an output voltage that follows a preset reference voltage; and a controller configured to control the switching module to operate in one from among a full bridge mode and a half bridge module based on a peak voltage of the rectified power, adjust a switching frequency of the switching module based on the output voltage, control switching of each of the first switching element and the second switching element based on the output voltage, and adjust a duty ratio of each of the first switching element and the second switching element based on the rectified power.

The controller may be further configured to adjust the duty ratio of each of the first switching element and the second switching element by adding a preset offset to a difference between a current magnitude of the rectified power and a value obtained by multiplying a voltage level of the rectified power by a preset coefficient.

The transformer may include a resonance capacitor provided on a line connected between the transformer and the switching module, and the controller may be further configured to identify a resonance frequency between a leakage inductance at a side of the line connected to the switching module and the resonance capacitor as the switching frequency of the switching module.

The controller may be further configured to decrease the identified switching frequency based on the output voltage output through the outputter becoming lower than the preset reference voltage, and increase the identified switching frequency based on the output voltage output through the outputter becoming higher than the preset reference voltage.

The switching module may include a first pair of switching elements connected in series to each other and a second pair of switching elements connected in parallel with each other, the first pair of switching elements may include a third switching element and a fourth switching element, the second pair of switching elements may include a fifth switching element and a sixth switching element connected in parallel to the first pair of switching elements, and the controller may be further configured to control the third switching element and the fourth switching element such that the third switching element and the fourth switching element are alternately in an On-state based on the switching frequency of the switching module.

The controller may be further configured to control the first switching element to an On-state at a point in which the third switching element is converted from an On-state to an Off-state, and control the second switching element to an On-state at a point in which the fourth switching element is converted from an On-state to an Off-state.

The controller may be further configured to control, based on the switching module being controlled to operate in the full bridge mode, the fifth switching element to be in phase with the fourth switching element and the sixth switching element to be in phase with the third switching element, and control, based on the switching module being controlled to operate in the half bridge mode, the fifth switching element to an Off-state and the sixth switching element to an On-state.

The outputter may include: a first diode that is connected to the first switching element by a first line; and a second diode that is connected to the second switching element by a second line. The first diode and the second diode may be connected in parallel, the first switching element and the second switching element may be connected in parallel, and the outputter may be connected to the transformer at a first connection point interposed between the first diode and the first switching element and a second connection point interposed between the second diode and the second switching element.

BRIEF DESCRIPTION OF THE DRAWINGS

The above and other aspects, features and advantages certain embodiments of the present disclosure will become apparent from the following description taken in conjunction with the accompanying drawings in which.

DETAILED DESCRIPTION

Figure 1:
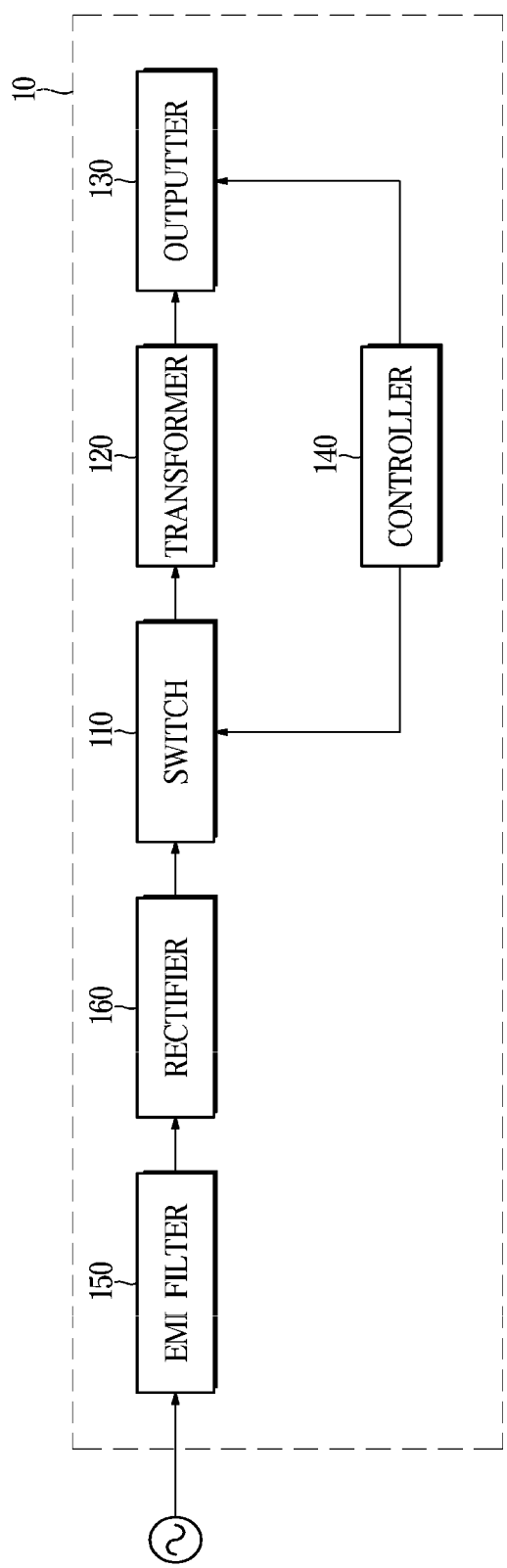
FIG. 1 is a control block diagram illustrating a power supply according to an embodiment.

Embodiments will be described with reference to the accompanying drawings. However, the disclosure is not limited to the embodiments described below, but may be implemented in several forms and may be variously modified. A description for these embodiments is provided only to make the disclosure complete and allow those skilled in the art to which the disclosure pertains to completely recognize the scope of the embodiments. In the accompanying drawings, sizes of components may be enlarged as compared with actual sizes for convenience of explanation, and ratios of the respective components may be exaggerated or reduced.

It will be further understood that the term "connect" or its derivatives refer both to direct and indirect connection, and the indirect connection includes a connection over a wireless communication network.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items. Also, the expression, "at least one of a, b, and c," should be understood as including only a, only b, only c, both a and b, both a and c, both b and c, or all of a, b, and c.

Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

Reference numerals used for method steps are just used for convenience of explanation, but not to limit an order of the steps. Thus, unless the context clearly dictates otherwise, the written order may be practiced otherwise Hereinafter, embodiments according to the disclosure will be described in detail with reference to the accompanying drawings.

Figure 2:
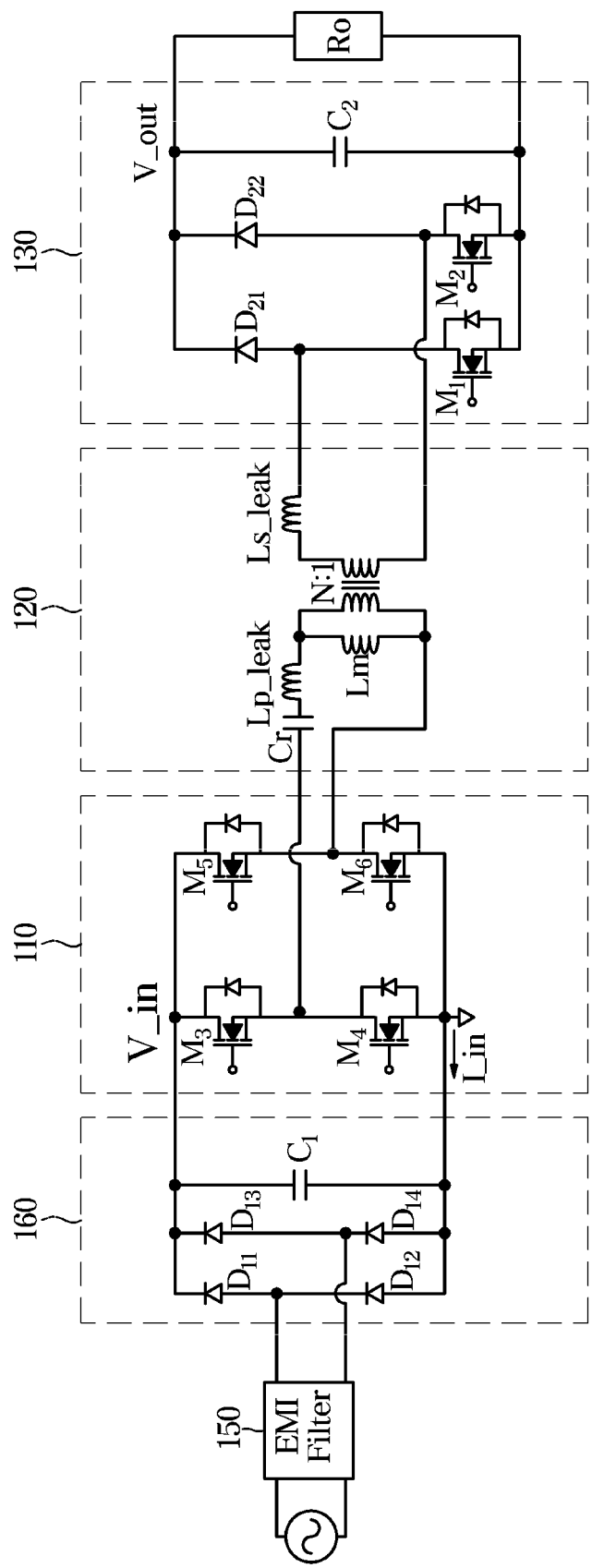
FIG. 2 is a diagram illustrating a circuit of a power supply according to an embodiment.

FIG. 1 is a control block diagram illustrating a power supply according to an embodiment, and FIG. 2 is a diagram illustrating a circuit of the power supply according to the embodiment.

Referring to FIG. 1, the power supply 10 according to the embodiment may include a switching module 110 that receives rectified power, a transformer 120 that receives first power having a frequency corresponding to a switching frequency from the switching module 110 and converts the received first power, an outputter 130 that is connected to the transformer 120 and includes a plurality of diodes $D_{21}$ and $D_{22}$ and a plurality of switching elements $M_1$ and $M_2$ and outputs an output voltage following a preset reference voltage according to switching of the switching elements $M_1$ and $M_2$, and a controller 140 that adjusts duty ratios of the switching elements of the outputter 130 based on a level of voltage and a magnitude of current of the rectified power.

In addition, the power supply 10 may include an electromagnetic interference (EMI) filter 150 removing electromagnetic noise generated by alternating current (AC) power and a rectifier 160 including a plurality of diodes D11, D12, D13, and D14 in the form of a full bridge to rectify AC power applied from an external power source. According to an embodiment, the rectifier 160 may include a first capacitor C1 for smoothing the rectified power.

The switching module 110 according to the embodiment may receive the rectified power from the rectifier 160, and may include a plurality of switching elements.

Referring to FIG. 2, the switching module 110 includes one pair of switching elements $M_3$ and $M_4$ connected in series with each other and another pair of switching elements $M_5$ and $M_6$ connected in series with each other.

In detail, the one pair of switching elements $M_3$ and $M_4$ of the switching module 110 includes a third switching element $M_3$ and a fourth switching element $M_4$ positioned at an upper end and a lower end with respect to the ground. In addition, the other pair of switching elements $M_5$ and $M_6$ is connected in parallel with the one pair of switching elements $M_3$ and $M_4$ and includes a fifth switching element $M_5$ and a sixth switching element $M_6$ positioned at an upper end and a lower end with respect to the ground.

That is, the switching module 110 may include the four switching elements $M_3$, $M_4$, $M_5$, and $M_6$ in the form of a full bridge.

The switching module 110 may supply a voltage between a connection point ① between the third switching element $M_3$ and the fourth switching element $M_4$ and a connection point ② between the fifth switching element $M_5$ and the sixth switching element $M_6$ to the transformer 120 as first power.

The transformer 120 according to the embodiment may receive the first power having a frequency corresponding to a switching frequency from the switching module 110, and transform the first power.

To this end, the transformer 120 may include a first winding 121 and a second winding 122 having a turns ratio of N:1. In this case, N is a constant equal to or larger than 1, and may be set differently according to the design of the transformer 120.

In this case, the transformer 120, as shown in FIG. 2, is illustrated as including a first inductor Lp_leak corresponding to a leakage inductance at a side of a line connected to the switching module 110, a second inductor Ls_leak corresponding to a leakage inductance at a side of a line connected to the outputter 130, and a third inductor Lm connected in parallel with the first winding 121.

In addition, the transformer 120 may include a resonance capacitor $C_r$ provided on the line connected to the switching module 110.

The outputter 130 according to the embodiment receives the transformed first power from the transformer 120, and includes the first switching element $M_1$ and the second switching element $M_2$ connected to the transformer 120.

In detail, the outputter 130 includes a first diode $D_{21}$, a second diode $D_{22}$, the first switching element $M_1$ connected in series with the first diode $D_{21}$ and the second diode $D_{22}$ connected in series with the second diode $D_{22}$.

In this case, the first diode $D_{21}$ is positioned at an upper side relative to the first switching element $M_1$ with respect to the ground, and the second diode $D_{22}$ is positioned at an upper side relative to the second switching element $M_2$ with respect to the ground.

In addition, a line including the first diode $D_{21}$ and the first switching element $M_1$ and a line including the second diode $D_{22}$ and the second switching element $M_2$ are connected in parallel with each, and are each connected in parallel with a load $R_0$. Further, the outputter 130 may include a second capacitor $C_2$ connected in parallel with each of the lines for circuit stabilization.

The outputter 130 is connected to the transformer 120 through a connection point between the first diode $D_{21}$ and the first switching element $M_1$ and a connection point between the second diode $D_{22}$ and the second switching element $M_2$.

That is, the outputter 130 may include a first line including the first diode $D_{21}$ positioned at the upper end and the first switching element $M_1$ positioned at the lower end and a second line connected in parallel with the first line and including the second diode $D_{22}$ positioned at the upper end and the second switching element $M_2$ positioned at the lower end.

In addition, the outputter 130 may be connected to the transformer 120 through a connection point between the first diode $D_{21}$ and the first switching element $M_1$ and a connection point between the second diode $D_{22}$ and the second switching element $M_2$.

The switching elements $M_1$, $M_2$, $M_3$, $M_4$, $M_5$, and $M_6$ of the power supply 10 may include a bipolar junction transistor (BJT), a metal-oxide-semiconductor field effect transistor (MOSFET), an insulated gate bipolar transistor (IGBT), a thyristor, and the like. However, the type of the switching element is not limited to the above example, and may include any element without limitation as long as it can perform a switching operation. Hereinafter, the following description will assume that the switching elements $M_1$, $M_2$, $M_3$, $M_4$, $M_5$, and $M_6$ are provided using a MOSFET.

The controller 140 according to the embodiment may adjust the switching frequency of the switching module 110 based on the output voltage.

In detail, the controller 140 may determine a resonance frequency between the first inductor Lp_leak corresponding to the leakage inductance at the side of the line connected to the switching module 110 and the resonance capacitor $C_r$ as the switching frequency of the switching module 110.

In this case, when the output voltage output through the outputter 130 becomes lower than a preset reference voltage desired to be output, the controller 140 may adjust the determined switching frequency in a direction that the determined switching frequency decreases. With such a configuration, the controller 140 may increase the gain between the rectified power and the output voltage, that is, a step-up ratio.

In addition, when the output voltage output through the outputter 130 becomes higher than the preset reference voltage desired to be output, the controller 140 may adjust the determined switching frequency in a direction that the determined switching frequency increases. With such a configuration, the controller 140 may decrease the gain between the rectified power and the output voltage, that is, a step-up ratio.

The controller 140 according to the embodiment may control the switching elements $M_3$, $M_4$, $M_5$, and $M_6$ of the switching module 110 based on the switching frequency.

In detail, the controller 140 may control the third switching element $M_3$ and the fourth switching element $M_4$ such that the third switching element $M_3$ and the fourth switching element $M_4$ are alternately converted to an On-state based on the switching frequency.

In this case, the controller 140 may control the switching module 110 to operate in a full bridge mode in which the fifth switching element $M_5$ is in phase with the fourth switching element $M_4$ and the sixth switching element $M_6$ is in phase with the third switching element $M_3$ or a half bridge mode in which the fifth switching element $M_5$ is at an Off-state and the sixth switching element $M_6$ is at an On-state, based on a peak voltage of the rectified power or the switching frequency.

That is, the controller 140 according to the embodiment may determine the operation mode of the switching module 110 based on the level of the peak voltage of the rectified power or the switching frequency. The determining of the operation mode of the switching module 110 will be described in detail below.

The controller 140 according to the embodiment may control switching of each of the first switching element $M_1$ and the second switching element $M_2$ based on the output voltage of the outputter 130.

That is, the controller 140 may control switching of each of the first switching element $M_1$ and the second switching element $M_2$ based on the switching frequency of the switching module 110 adjusted according to the output voltage of the outputter 130.

In detail, the controller 140 controls the first switching element $M_1$ to an On-state at a point where the third switching element $M_3$ is converted from an On-state to an Off-state, and controls the second switching element $M_2$ to be an On-state at a point where the fourth switching element $M_4$ is converted from an On-state to an Off-state.

That is, the controller 140 may control the first switching element $M_1$ to at an On-state at a point where the third switching element $M_3$ is converted from an On-state to an Off-state while the fourth switching element $M_4$ is converted from an Off-state to an On-state.

In addition, the controller 140 may control the second switching element $M_2$ to an On-state at a point where the fourth switching element $M_4$ is converted from an On-state to an Off-state while the third switching element $M_3$ is converted from an Off-state to an On-state.

The controller 140 according to the embodiment may adjust the duty ratio of each of the first switching element $M_1$ and the second switching element $M_2$ included in the outputter 130 so as to adjust the time in which both the first switching element $M_1$ and the second switching element $M_2$ are at an On-state, based on the level of the voltage of the rectified power applied to the switching module 110 and the magnitude of the current of the rectified power applied to the switching module 110.

In detail, the controller 140 may adjust the duty ratio of each of the first switching element $M_1$ and the second switching element $M_2$ by adding a preset offset to a value of the current magnitude of the rectified power applied to the switching module 110 minus a multiplication result of the voltage level of the rectified power applied to the switching module 110 and a preset coefficient.

Since the first switching element $M_1$ is converted to an On-state at the point where the third switching element $M_3$ is converted to an Off-state, and the second switching element $M_2$ is converted to On-state at the point where the fourth switching element $M_4$ is converted to an Off-state, the on/off timing of the first switching element $M_1$ may be different from that of the second switching element $M_2$.

In this case, the duty ratio of each of the first switching element $M_1$ and the second switching element $M_2$ may be the same, and as the duty ratio increases, the time in which both the first switching element $M_1$ and the second switching element $M_2$ are at an On-state may be lengthened.

The longer the time in which both the first switching element $M_1$ and the second switching element $M_2$ are at an On-state, the higher the gain between the rectified power and the output voltage, that is, the higher the step-up ratio. The operation of adjusting the duty ratio of each of the first switching element $M_1$ and the second switching element $M_2$ will be described below in detail.

The controller 140 may include at least one memory that stores a program that performs the above-described operations and operations to be described below, and at least one processor that executes the stored program.

In addition, the power supply 10 may further include a voltage detecting circuit (not shown) for measuring the level of the voltage of the rectified power applied to the switching module 110, and a current detecting circuit (not shown) for measuring the magnitude of the current of the rectified power applied to the switching module 110. In addition, the power supply 10 may further include a voltage detecting circuit (not shown) for measuring the level of the output voltage output from the outputter 130.

In the above, the operations and circuit configurations of components included in the power supply 10 has been described in detail. Hereinafter, power factor correction and voltage boost according to the operation of the power supply 10 will be described in detail.

Figure 3:
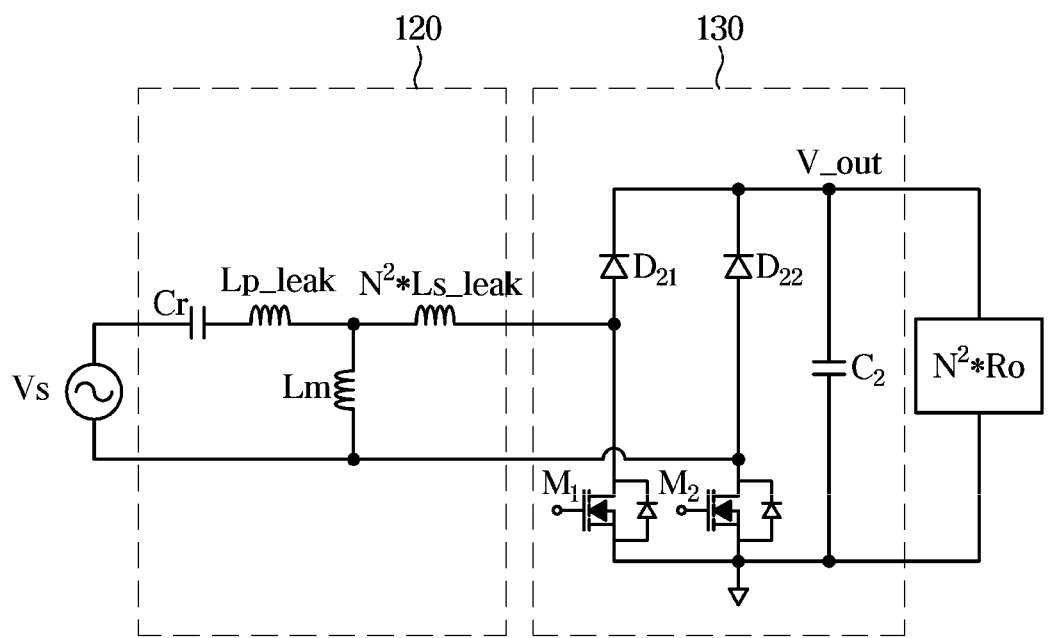
FIG. 3 is a diagram illustrating an equivalent circuit of a power supply according to an embodiment.
Figure 4:
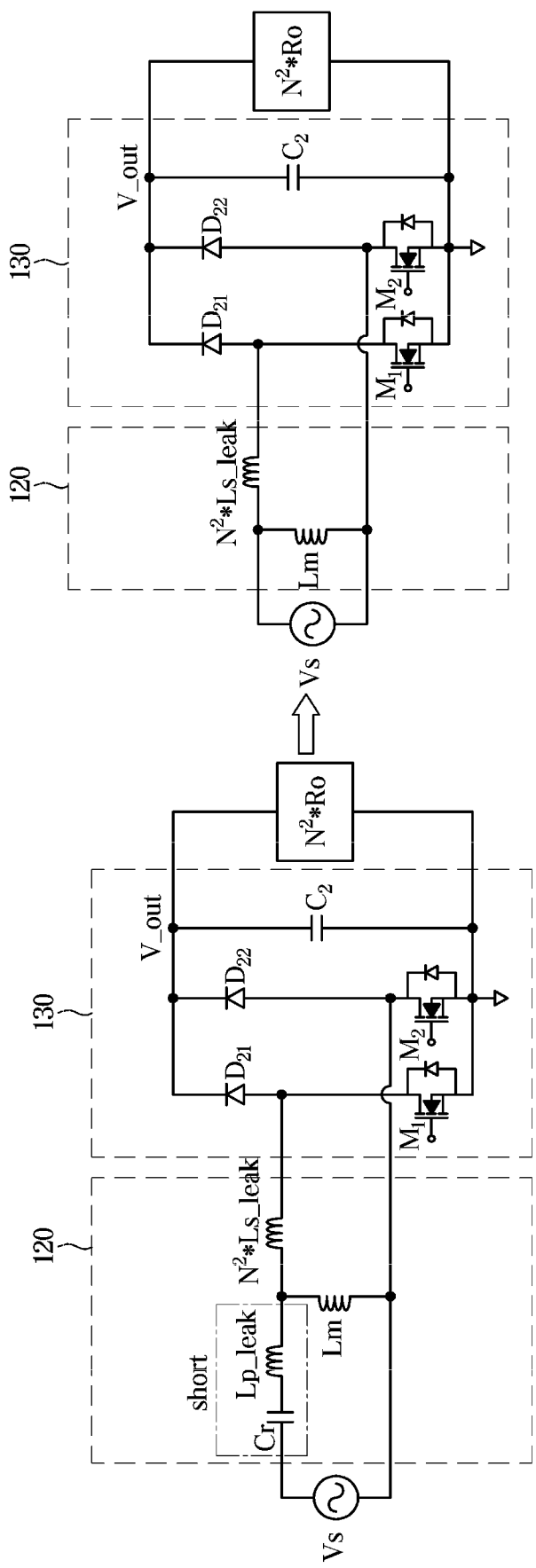
FIG. 4 is a diagram for describing an operation of correcting a power factor by a power supply according to an embodiment.

FIG. 3 is a diagram illustrating an equivalent circuit of the power supply 10 according to the embodiment, and FIG. 4 is a diagram for describing an operation of correcting a power factor by the power supply 10 according to the embodiment.

Referring to FIG. 3, the transformer 120 according to the embodiment may represent a T-type equivalent circuit.

In detail, the transformer 120 may be converted into a T-type equivalent circuit that forms a T-shape by including a first inductor Lp_leak corresponding to a leakage inductance at a side of a line connected to the switching module 110, a second inductor $N^2$*Ls_leak corresponding to a leakage inductance at a side of a line connected to the outputter 130, and a third inductor Lm provided between a connection point between the first inductor Lp_leak and the second inductor $N^2$*Ls_leak and ground. In this case, the inductance of the second inductor $N^2$*Ls_leak corresponds to the square of the turns ratio N of the first winding 121 and the second winding 122 when compared to the inductance of that in FIG. 2.

In this case, $V_s$ may correspond to the voltage of the first power applied to the transformer 120 from the switching module 110. That is, $V_s$ may correspond to a voltage applied between the connection point between the third switching element $M_3$ and the fourth switching element $M_4$ and the connection point between the fifth switching element $M_5$ and the sixth switching element $M_6$.

The controller 140 according to the embodiment may adjust the switching frequency of the switching module 110.

In detail, the controller 140 may determine the resonance frequency between the first inductor Lp_leak corresponding to the leakage inductance at the side of the line connected to the switching module 110 and the resonance capacitor $C_r$ as the switching frequency of the switching module 110.

When the switching frequency of the switching module 110 corresponds to the resonance frequency between the first inductor Lp_leak and the resonant capacitor $C_r$, the first power has a frequency corresponding to the switching frequency, and thus as shown in FIG. 4, the first inductor Lp_leak and the resonant capacitor $C_r$ may be represented as being shorted.

In this case, as shown in FIG. 4, the power supply 10 may allow the current flowing through the second inductor $N^2$*Ls_leak to be controlled by switching of the first switching element $M_1$, and allow the current flowing through the third inductor Lm to be controlled by switching of the second switching element $M_2$.

That is, as shown in FIG. 4, the power supply 10 may provide a circuit configuration similar to a power factor correction (PFC) circuit.

The conventional power supply circuit is provided with a separate interleaved PFC circuit including two inductors and switches corresponding to the respective inductors for power factor correction between a rectifying circuit for rectifying AC power and an output circuit for performing voltage transformation to supply a load with a voltage of a constant level.

The power supply 10 according to the disclosure, as shown in FIG. 4, may provide a function of power factor correction by controlling the current in the second inductor $N^2$*Ls_leak and the third inductor Lm based on the alternated switching of the first switching element $M_1$ and the second switching element $M_2$ without providing a separate PFC circuit. As such, the power supply 10 according to the disclosure provides a function of power factor correction together with a function of regulating the input voltage to a voltage of a predetermined level, unlike the conventional power supply circuit that performs voltage regulation after power factor correction, thereby improving the efficiency of the entire system.

That is, the power supply 10 according to the disclosure may omit a separate inductor for a PFC circuit by using the second inductor $N^2$*Ls_leak and the third inductor Lm of the transformer 120.

Accordingly, the power supply 10 according to the disclosure does not need to have a plurality of elements (for example, inductors) for constructing a separate PFC circuit, thereby providing a smaller volume, less heat generation, and advantages in the material cost.

Figure 5:
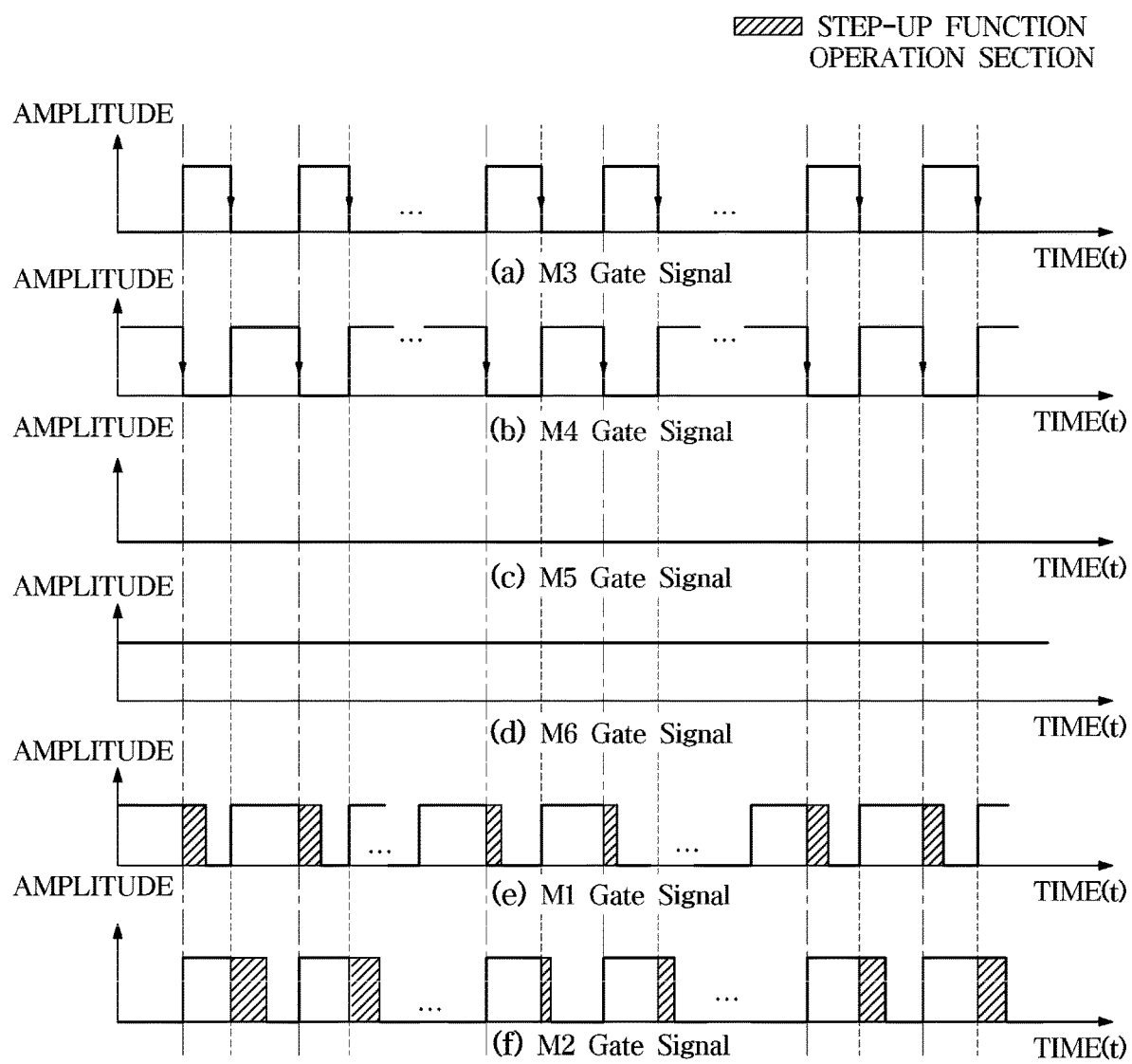
FIG. 5 is a diagram for describing an operation of controlling switching elements in a half bridge mode by a power supply according to an embodiment.
Figure 6:
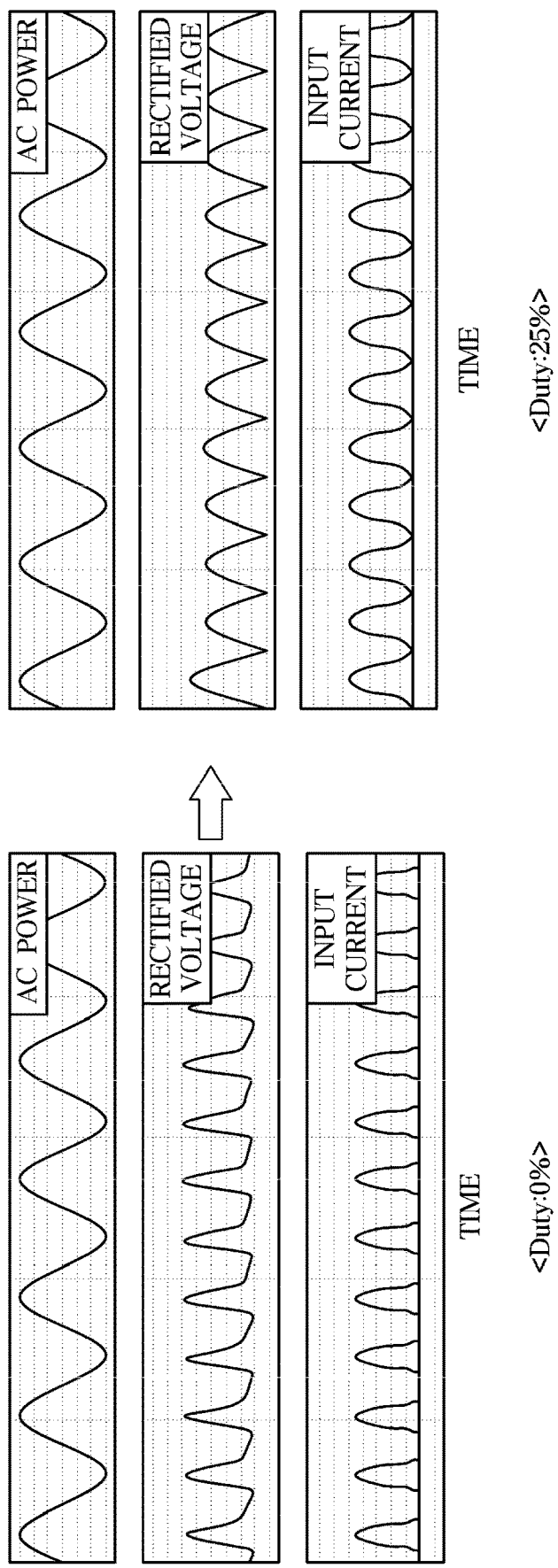
FIG. 6 is a diagram illustrating an example in which a power factor is adjusted as a power supply adjusts duty ratios of a first switching element and a second switching element according to an embodiment.
Figure 7:
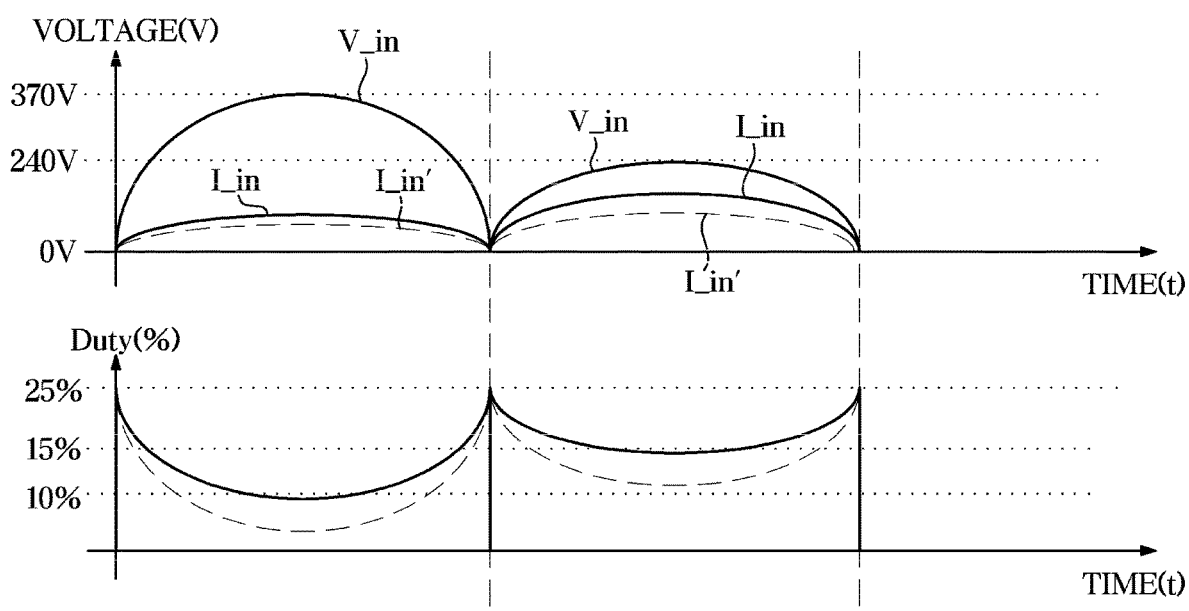
FIG. 7 is a diagram for describing an operation of adjusting duty ratios of a first switching element and a second switching element by a power supply according to an embodiment.
Figure 8:
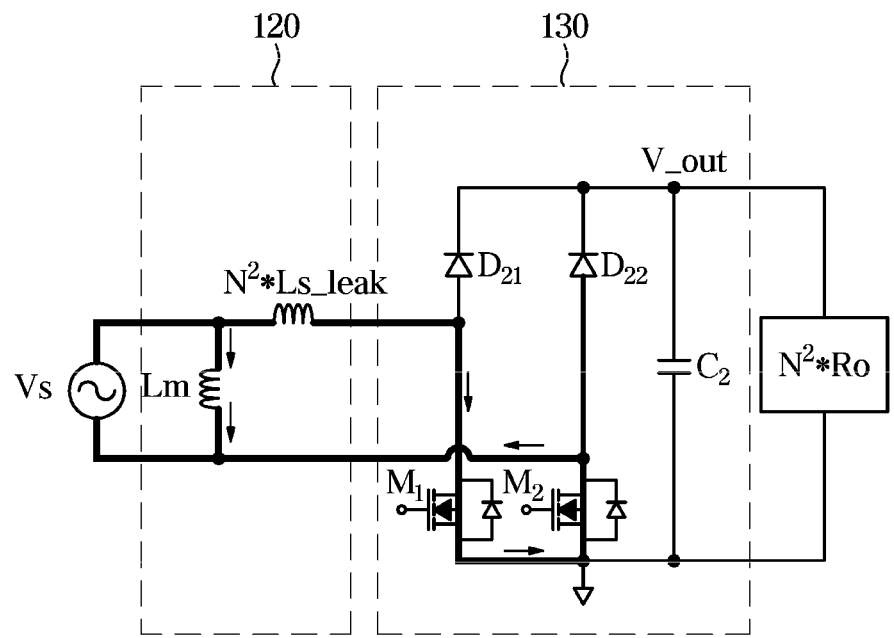
FIG. 8 is a diagram illustrating a flow of current according to switching of a power supply according to an embodiment.
Figure 9:
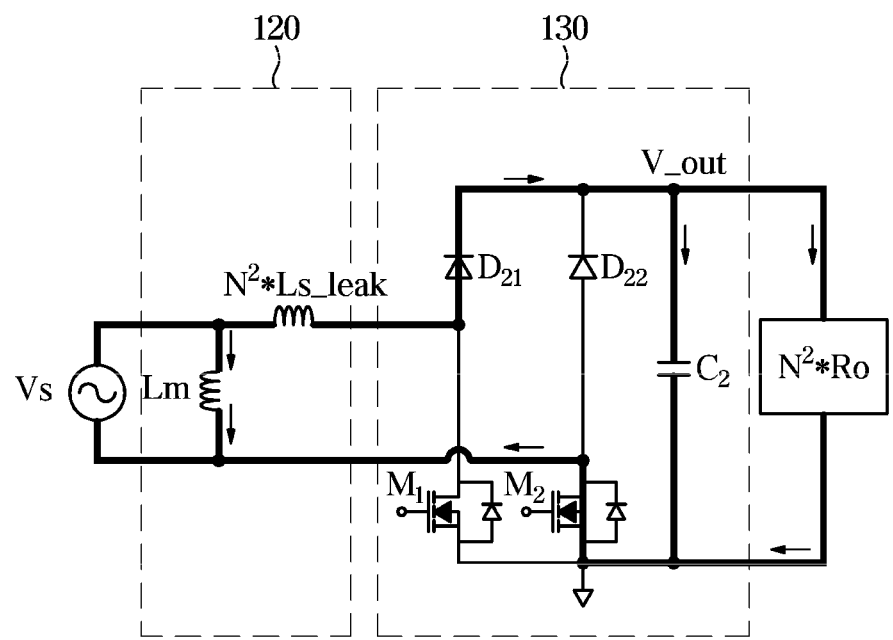
FIG. 9 is a diagram illustrating a flow of current according to switching of a power supply according to an embodiment.
Figure 10:
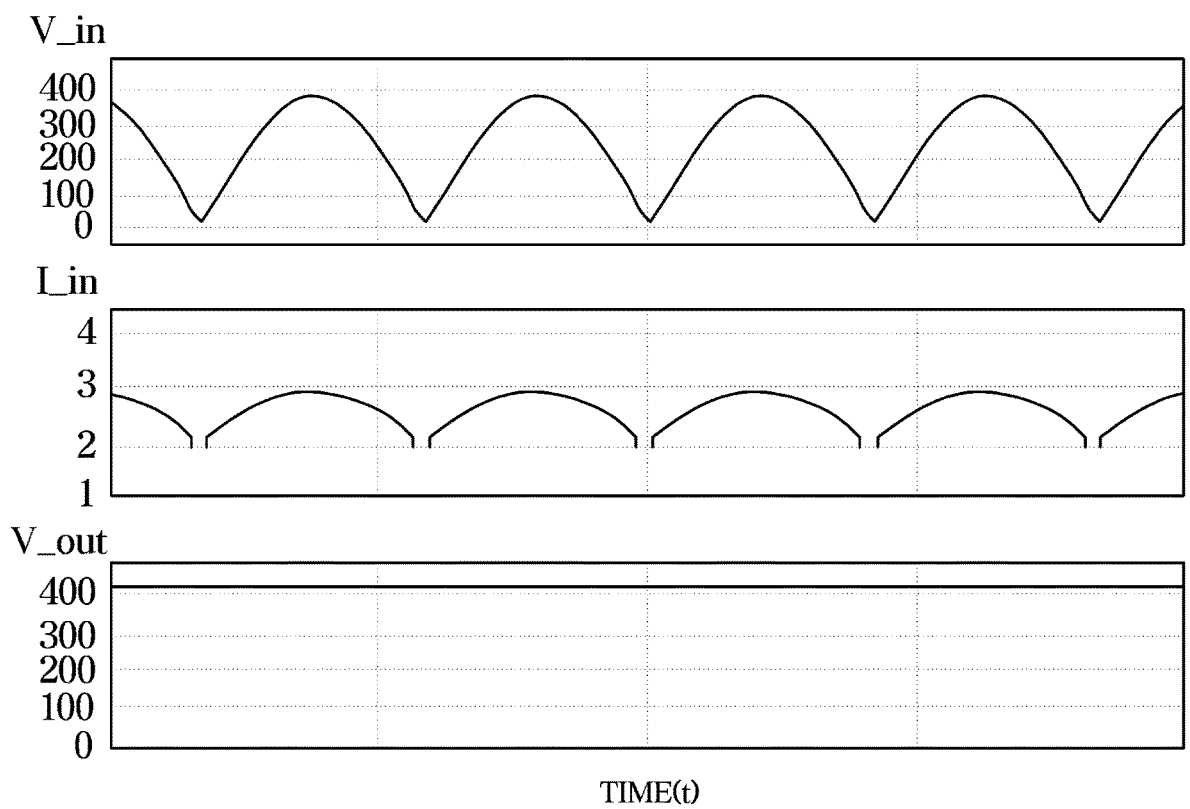
FIG. 10 is a diagram illustrating an output voltage of a power supply according to an embodiment.

FIG. 5 is a diagram for describing an operation of controlling the switching elements $M_1$, $M_2$, $M_3$, $M_4$, $M_5$, and $M_6$ in a half bridge mode by the power supply 10 according to the embodiment, FIG. 6 is a diagram illustrating an example in which a power factor is adjusted as a power supply adjusts duty ratios of the first switching element $M_1$ and the second switching element $M_2$ according to the embodiment, FIG. 7 is a diagram for describing an operation of adjusting duty ratios of the first switching element $M_1$ and the second switching element $M_2$ by the power supply 10 according to the embodiment, FIGS. 8 and 9 are diagrams illustrating a flow of current according to switching of the power supply 10 according to the embodiment, and FIG. 10 is a diagram illustrating an output voltage of the power supply 10 according to an embodiment.

Referring to FIG. 5, the power supply 10 according to the embodiment performs alternating switching of the first switching element $M_1$ and the second switching element $M_2$ to provide a function of power factor correction.

In detail, the controller 140 according to the embodiment may control the switching elements $M_3$, $M_4$, $M_5$, and $M_6$ of the switching module 110 based on the switching frequency.

The controller 140 may control the third switching element $M_3$ and the fourth switching element $M_4$ such that the third switching element $M_3$ and the fourth switching element $M_4$ are alternately converted to an On-state based on the switching frequency.

In this case, the controller 140 may control switching of each of the first switching element $M_1$ and the second switching element $M_2$ based on the output voltage of the outputter 130.

That is, the controller 140 may control switching of each of the first switching element $M_1$ and the second switching element $M_2$ based on the switching frequency of the switching module 110 adjusted according to the output voltage of the outputter 130.

In detail, the controller 140 controls the first switching element $M_1$ to an On-state at the point where the third switching element $M_3$ is changed from an On-state to an Off-state, and controls the second switching element $M_2$ to an On-state at the point where the fourth switching element $M_4$ is changed from an On-state to an Off-state.

That is, the controller 140 may control the first switching element $M_1$ to an On-state at the point where the third switching element $M_3$ is changed from an On-state to an Off-state while the fourth switching element $M_4$ is changed from an Off-state to an On-state.

In addition, the controller 140 may control the second switching element $M_2$ to an On-state at the point where the fourth switching element $M_4$ is changed from an On-state to an Off-state while the third switching element $M_3$ is changed from an Off-state to an On-state.

In other words, the controller 140 controls the first switching element $M_1$ and the second switching element $M_2$ to be trigger-synchronized at the falling edges of the third switching element $M_3$ and the fourth switching element $M_4$, respectively, to perform zero voltage switching.

In this way, the controller 140 controls the switch timing such that the first switching element $M_1$ and the second switching element $M_2$ are alternately switched, and adjusts the duty ratios of the respective switching elements $M_1$ and $M_2$, thereby adjusting the power factor in the rectified power applied to the switching module 110 while allowing the output voltage to follow a preset reference voltage, and also reducing a free-wheeling diode loss in each of the first switching element $M_1$ and the second switching element $M_2$.

That is, as illustrated in FIG. 6, when the controller 140 adjusts the duty ratio of each of the first switching element $M_1$ and the second switching element $M_2$ in a direction that the duty ratio increases, a phase difference between the voltage of the rectified power supply and the current of the rectified power decreases, so that the reactive power provided by the power supply 10 is reduced and thus the power factor may be corrected.

To this end, the controller 140 according to the embodiment may adjust the duty ratio of each of the first switching element $M_1$ and the second switching element $M_2$ so as to adjust the time when both the first switching element $M_1$ and the second switching element $M_2$ included in the outputter 130 are at an On-state based on the voltage level and the current magnitude of the rectified power applied to the switching module 110.

In detail, the controller 140 may adjust the duty ratio of each of the first switching element $M_1$ and the second switching element $M_2$ by adding a preset offset to a value of the current magnitude of the rectified power applied to the switching module 110 minus a multiplication result of the voltage level of the rectified power applied to the switching module 110 and a preset coefficient. According to an embodiment, the controller 140 may perform scaling of the entire duty ratio or allow each of the switching elements $M_1$ and $M_2$ to be at an Off-state by multiplying the duty ratio calculated by adding the preset offset by a preset coefficient.

For example, as illustrated in FIG. 7, the controller 140, when the voltage level V_in of the rectified power increases with time, may adjust the duty ratio in a direction that the duty ratio decreases to shorten the time when both the first switching element $M_1$ and the second switching element $M_2$ are at an On-state, and when the voltage level V_in of the rectified power decreases with time, may adjust the duty ratio in a direction that the duty ratio increases to lengthen the time when both the first switching element $M_1$ and the second switching element $M_2$ are at an On-state.

That is, as illustrated in FIG. 7, when the voltage level V_in of the rectified power source with time is provided in the form of a sine wave that increases, and at the highest point, decreases as shown in FIG. 7, the duty ratio may form a parabolic curve that is concave downward.

Accordingly, the time when both the first switching element $M_1$ and the second switching element $M_2$ are at an On-state may have an appearance of alternately decreasing and increasing with time as illustrated in FIG. 5. That is, when the voltage level V_in of the rectified power with time is provided in the form of a sine wave that increases, and at the highest point, decreases, the time when both the first switching element $M_1$ and the second switching element $M_2$ are at an On-state may be shortest at the point where the voltage level V_in of the rectified power reaches the highest point.

In addition, as illustrated in FIG. 7, when the voltage level V_in of the rectified power is provided in the form of a sine wave and has a lower highest point, the controller 140 may adjust the duty ratio in a direction that the duty ratio increases by reflecting the lowered highest point of the voltage level. In this case, the degree to which the duty ratio is concave downward may be reduced.

In addition, the controller 140, when the current magnitude I_in of the rectified power increases according to the state of the load, may adjust the duty ratio in a direction that the duty ratio increases to lengthen the time when both the first switching element $M_1$ and the second switching element $M_2$ are at an On-state, and when the current magnitude I_in of the rectified power decreases according to the state of the load, may adjust the duty ratio in a direction that the duty ratio decreases to shorten the time when both the first switching element $M_1$ and the second switching element $M_2$ are at an On-state.

In detail, the load to which an output voltage is applied by the power supply 10 may have a resistance whose magnitude greatly varies with an operation mode. For example, when a device provided with the power supply 10 is converted from an operating mode to a standby mode, the magnitude of resistance of the load may be increased, and in such a light load situation, the current magnitude I_in of the rectified power may decrease to I_in' as shown in FIG. 7.

In this case, the controller 140 may adjust the duty ratio in a direction that the duty ratio decreases to shorten the time when both the first switching element $M_1$ and the second switching element $M_2$ are at an On-state, and consequently, the degree to which the duty ratio is concave downward may increase.

In addition, when the device provided with the power supply 10 is converted from the standby mode to the operating mode, the resistance magnitude of the load may be lowered, and in such a heavy load situation, the current magnitude I_in' of the rectified power may be increased to I_in as shown in FIG. 7.

In this case, the controller 140 may adjust the duty ratio in a direction that the duty ratio increases to lengthen the time when both the first switching element $M_1$ and the second switching element $M_2$ are at an On-state, and consequently, the degree to which the duty ratio is concave downward is reduced.

In general, as the duty ratio increases, the step-up ratio between the voltage level of the rectified power and the output voltage increases, and similarly, in the power supply 10 according to the embodiment, when the duty ratio is increased and thus the time when both the first switching element $M_1$ and the second switching element $M_2$ are at an On-state is increased, a higher gain between the rectified power and the output voltage, that is, a higher step-up ratio is provided.

That is, as illustrated in FIG. 8, when both the first switching element $M_1$ and the second switching element $M_2$ are at an On-state, current does not flow to the load but flow to the second inductor $N^2*Ls\_leak$ and the third inductor Lm of the transformer 120, so that the power supply 10 may perform boosting based on the second inductor $N^2*Ls\_leak$ and the third inductor Lm of the transformer 120.

In addition, as shown in FIG. 9, when the first switching element $M_1$ is at an Off-state and the second switching element $M_2$ is at an On-state, current flows to the load, so that that the power supply 10 may transfer the output voltage boosted based on the second inductor $N^2*Ls\_leak$ and the third inductor Lm of the transformer 120 to the load.

As such, based on the duty ratio adjustment of the controller 140, the outputter 130 may output the output voltage following the preset reference voltage even when the voltage level V_in or the current magnitude I_in of the rectified power with time as shown in FIG. 10.

In the above, the operation in which the power supply 10 adjusts the duty ratios of the first switching element $M_1$ and the second switching element $M_2$ has been described in detail. Hereinafter, an operation of converting the operation mode of the switching module 110 by the power supply 10 will be described in detail.

Figure 11:
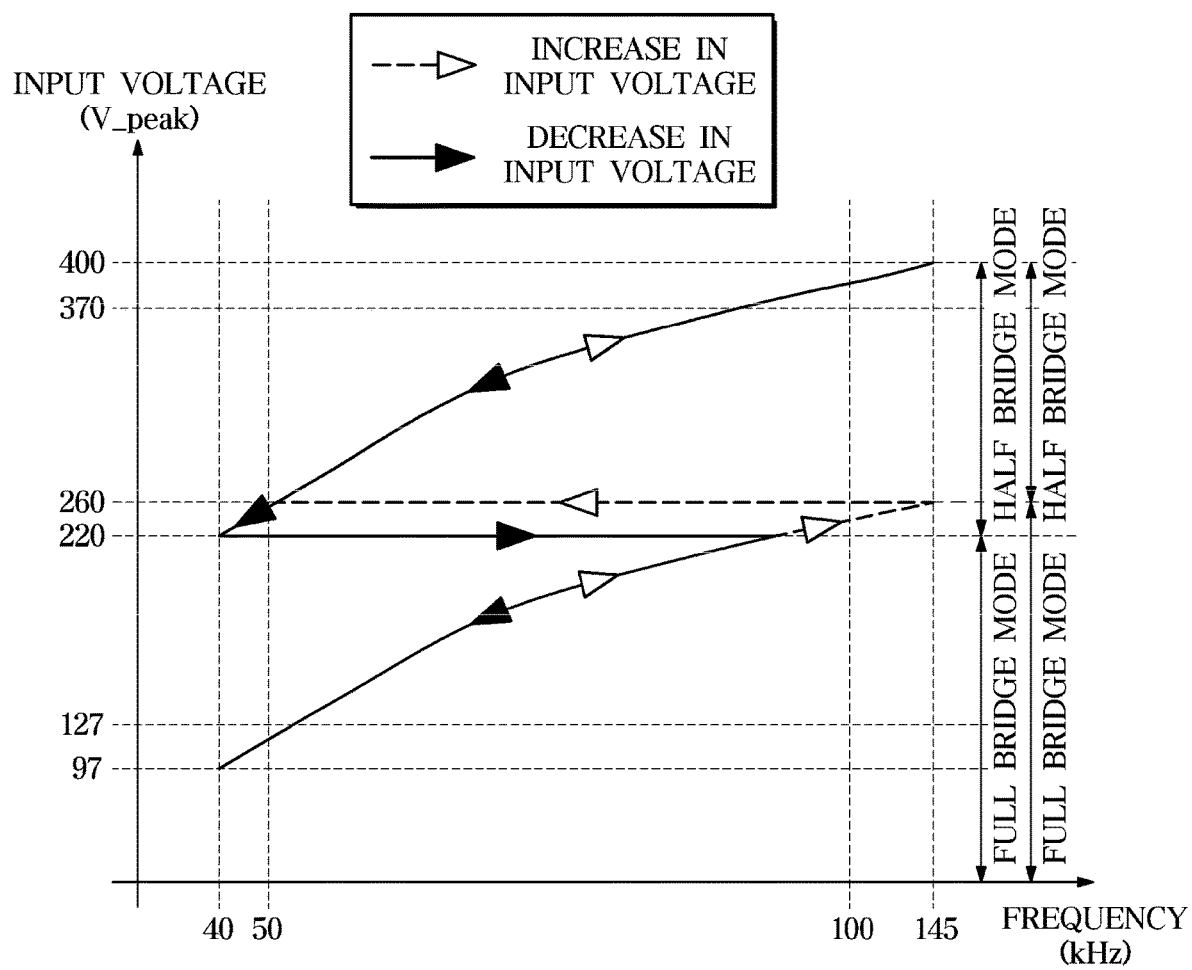
FIG. 11 is a diagram for describing mode conversion of a switching module according to an embodiment.

FIG. 11 is a diagram for describing mode conversion of the switching module 110 according to the embodiment.

Referring to FIG. 11, the controller 140 according to the embodiment adjusts the switching frequency of the switching module 110 in a direction that the switching frequency decreases when the output voltage output through the outputter 130 becomes lower than the preset reference voltage, and adjusts the switching frequency of the switching module 110 in a direction that the switching frequency increases when the output voltage output through the outputter 130 becomes higher than the preset reference voltage.

That is, the controller 140 may adjust the gain between the voltage $V_s$ of the first power applied from the switching module 110 to the transformer 120 and the output voltage by adjusting the switching frequency.

In detail, the controller 140 may increase the gain between the voltage $V_s$ of the first power applied from the switching module 110 to the transformer 120 and the output voltage by lowering the switching frequency of the switching module 110, and may reduce the gain between the voltage $V_s$ of the first power applied from the switching module 110 to the transformer 120 and the output voltage by increasing the switching frequency of the switching module 110.

Accordingly, even when the peak voltage of the AC power input to the power supply 10 varies, the power supply 10 adjusts the switching frequency of the switching module 110, to thereby adjust the gain between the voltage $V_s$ of the first power output from the switching module 110 1 and the output voltage and adjust the output voltage to follow the preset reference voltage.

That is, the power supply 10, when the peak voltage $V_{-peak}$ of the rectified power input to the switching module 110 decreases, may adjust the switching frequency of the switching module 110 in a direction that the switching frequency decreases, and when the peak voltage $V_{-peak}$ of the rectified power input to the switching module 110 increases, may adjust the switching frequency of the switching module 110 in a direction that the switching frequency increases as shown in FIG. 11.

In this case, the controller 140 according to the embodiment may control the switching module 110 to operate in a full bridge mode in which the fifth switching element $M_5$ is in phase with the fourth switching element $M_4$ and the sixth switching element $M_6$ is in phase with the third switching element $M_3$ or a half bridge mode in which the fifth switching element $M_5$ is at an Off-state and the sixth switching element $M_6$ is at an On-state, based on the level of the peak voltage $V_{-peak}$ of the rectified power or the switching frequency.

In detail, the controller 140 may control the switching module 110 to operate in one of the full bridge mode and the half bridge mode based on the peak voltage of the rectified power.

In this case, the controller 140, when controlling the switching module 110 to operate in the full bridge mode, may control the fifth switching element $M_5$ to be in phase with the fourth switching element $M_4$ while controlling the sixth switching element $M_6$ to be in phase with the third switching element $M_3$, and when controlling the switching module 110 to operate in the half bridge mode, may control the fifth switching element $M_5$ to an Off-state and control the sixth switching element $M_6$ to an On-state.

That is, when the peak voltage $V_{-peak}$ of the rectified power is low, the controller 140 allows the switching module 110 to operate in the full bridge mode such that the whole peak voltage $V_{-peak}$ of the rectified power is applied to the switching module 110. In addition, when the peak voltage $V_{-peak}$ of the rectified power is high, the controller 140 allows the switching module 110 to operate in the half-bridge mode such that a half of the peak voltage $V_{\_peak}$ of the rectified power is applied to the switching module 110.

In other words, the controller 140 may allow the output voltage to follow a preset reference voltage by changing the mode of the switching module 110 according to the level of the peak voltage $V_{\_peak}$.

In this case, the controller 140 according to an embodiment, when the switching module 110 operates in the full bridge mode and the level of the peak voltage $V_{\_peak}$ of the rectified power increases to exceed a first threshold voltage (e.g., 260V), may control the switching module 110 to be converted from the full bridge mode to the half bridge mode.

In addition, the controller 140 according to an embodiment when the switching module 110 operates in the half-bridge mode and the level of the peak voltage $V_{\_peak}$ of the rectified power decreases to a level below a second threshold voltage (e.g., 220V), may control the switching module 110 to be converted from the half bridge mode to the full bridge mode.

That is, the controller 140 may adaptively convert the mode of the switching module 110 as the peak voltage $V_{\_peak}$ of the rectified power varies.

In this case, in order to add hysteresis characteristics to the mode conversion, the controller 140 may set the threshold voltage (for example, 260V) serving as a criterion for mode switching when the peak voltage $V_{\_peak}$ increases to be different from the threshold voltage (for example, 220V) serving as a criterion for mode conversion when the peak voltage decreases.

Such a configuration may prevent the mode conversion from constantly occurring with fluctuation of the peak voltage $V_{\_peak}$ at a conversion boundary between the full bridge mode and the half bridge mode, and remove unstable voltage regulation characteristics due to constant mode conversions.

The controller according to an embodiment, when the switching module 110 operates in the full bridge mode and the switching frequency of the switching module 110 increases to a level exceeding a first threshold frequency (for example, 145 kHz), may control the switching module 110 to be converted from the full bridge mode to the half bridge mode.

In addition, the controller 140 according to an embodiment, when the switching module 110 operates in the half bridge mode and the switching frequency decreases to a level below a second threshold frequency (e.g., 40 kHz), may control the switching module 110 to be converted from the half-bridge mode to the full bridge mode.

That is, the controller 140 adaptively adjusts the switching frequency of the switching module 110 according to a change in the peak voltage $V_{\_peak}$ of the rectified power, and may convert the mode of the switching module 110 based on the adjusted switching frequency. That is, the power supply 10 may determine whether to convert the mode based on the switching frequency, thereby preventing a malfunction of mode conversion due to variations in coils and various elements by mass production.

In this case, the switching elements $M_3$, $M_4$, $M_5$, and $M_6$ of the switching module 110 may be driven at a constant duty ratio (e.g., 50%) in both the full bridge mode and the half bridge mode, thereby preventing the circulation current that may occur in the mode conversion due to reduction of the duty ratio.

In addition, the power supply 10 according to the embodiment may replace each of the diodes $D_{21}$ and $D_{22}$ of the outputter 130 with a switching element, and synchronize the switching frequency of the replaced switching element with the switching frequency of the switching module 110, to further prevent loss from occurring in the switching element of the switching module 110 caused by free-wheeling diode.

Figure 12:
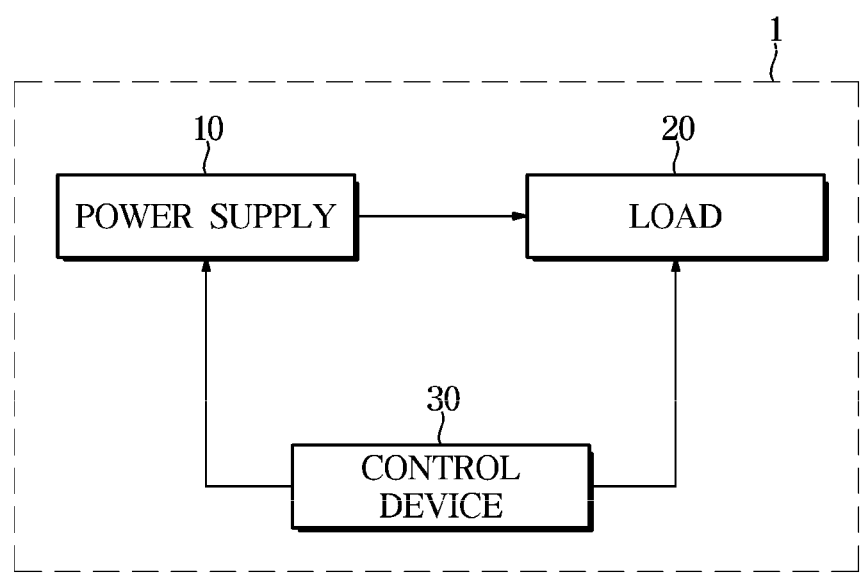
FIG. 12 is a control block diagram illustrating an electronic device according to an embodiment.

FIG. 12 is a control block diagram illustrating an electronic device 1 according to an embodiment.

Referring to FIG. 12, the electronic device 1 according to the embodiment includes a power supply 10 that receives power from an external power source and supplies the power, a load 20 that operates by receiving the power, and a control device 30 that controls the power supply 10 and the load 20.

The power supply 10 according to the embodiment may correspond to the power supply 10 described according to the embodiments of FIGS. 1 to 11.

That is, the power supply 10 includes the switching module 110, the transformer 120, and the outputter 130 to provide a power factor correction function while providing the load 20 with an output voltage that follows a preset reference voltage.

The load 20 according to the embodiment may operate on the output voltage supplied from the power supply 10. For example, the load 20 may correspond to a display (not shown) and may display an image under the control of the control device 30. As such, the load 20 refers to a device that provides a user with desired output based on the output voltage supplied from the power supply 10, and is not limited to the above example, and there is no limitation on the type.

In this case, the load 20 according to the embodiment may be represented by a resistance that varies according to the operation. For example, the load 20 in a standby mode may be represented by a resistance higher than that of the load 20 in an operating mode, and the load 20 in an operating mode may be represented by a resistance lower than that of the load 20 in a standby mode.

The control device 30 according to the embodiment may convert the mode of the load 20 according to the user's input, and may control the power supply 10 according to the mode conversion of the load 20.

Accordingly, the power supply 10 may adjust the duty ratio of each of the first switching element $M_1$ and the second switching element $M_2$ according to the mode of the load 20, to thereby correct the power factor in the power supply 10 while regulating the output voltage provided to the load 20 at a constant magnitude.

The control device 30 may be implemented using a memory that stores data regarding an algorithm for controlling operations of components in the electronic device 1 or a program for representing the algorithm and a processor that performs the above described operation using the data stored in the data. In addition, the control device 30 may be implemented as a single chip with the controller 140 of the power supply 10.

Hereinafter, an embodiment of a method of controlling the power supply 10 according to an aspect will be described. The power supply 10 according to the above-described embodiment may be used for the method of controlling the power supply 10. Therefore, the contents described above with reference to FIGS. 1 to 11 may be applied to the method of con trolling the power supply 10.

Figure 13:
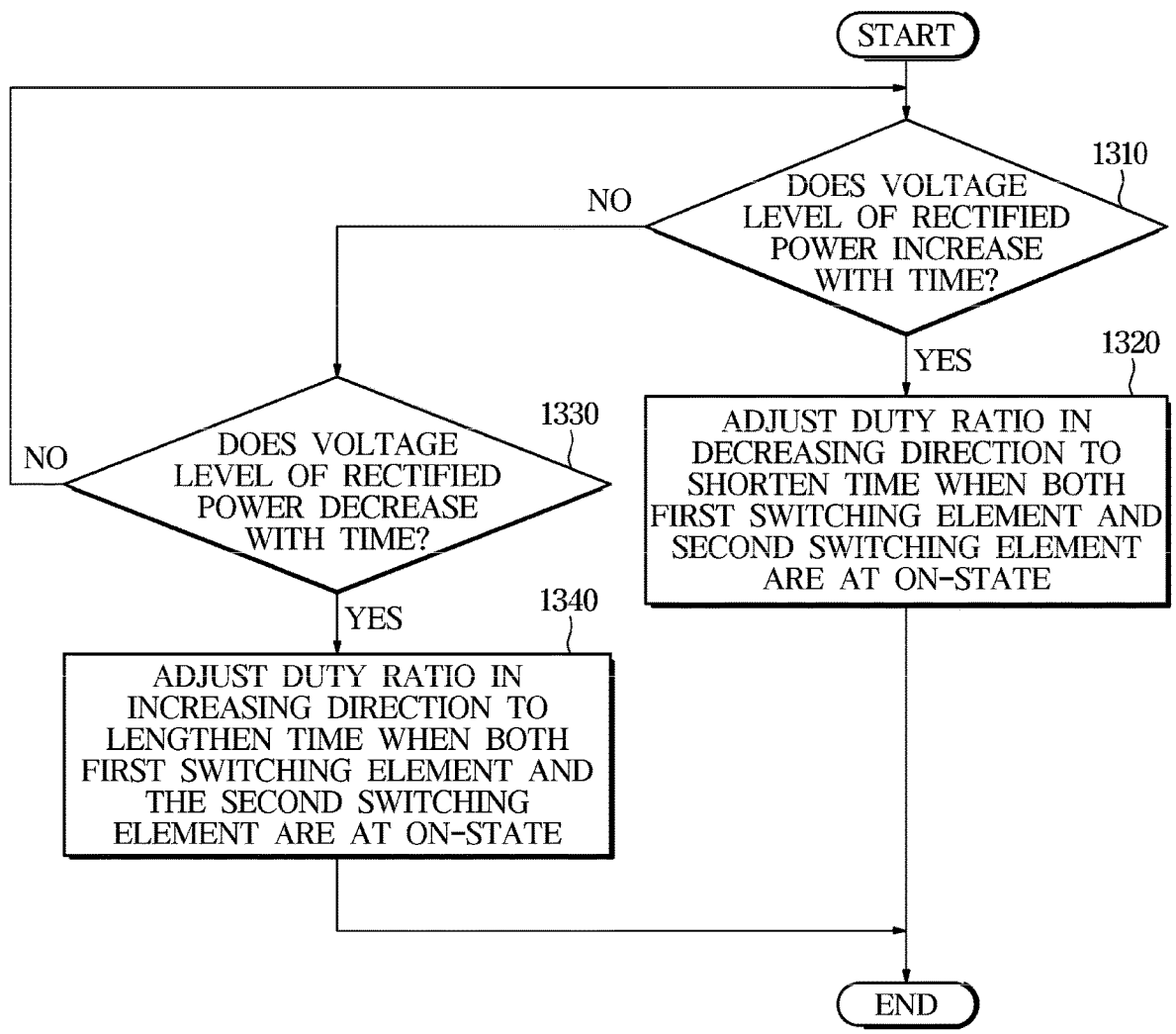
FIG. 13 is a flowchart showing a method of controlling a power supply according to an embodiment, which shows adjustment of a duty ratio according to a voltage level of rectified power.

FIG. 13 is a flowchart showing a method of controlling the power supply 10 according to an embodiment, which shows adjustment a duty ratio according to a voltage level of rectified power.

Referring to FIG. 13, the power supply 10 according to the embodiment, when the voltage level of the rectified power increases with time (YES in operation 1310), may adjust the duty ratio in a direction that the duty ratio decreases to shorten the time when both the first switching element $M_1$ and the second switching element $M_2$ are at an On-state (1320).

In addition, when the voltage level of the rectified power does not increase with time (NO in operation 1310) and the voltage level of the rectified power decreases with time (YES in operation 1330), the power supply 10 according to the embodiment may adjust the duty ratio in a direction that the duty ratio increases to lengthen the time when both the first switching element $M_1$ and the second switching element $M_2$ are at an On-state (1340).

In detail, the controller 140 may adjust the duty ratio of each of the first switching element $M_1$ and the second switching element $M_2$ by adding a preset offset to a value of the current magnitude of the rectified power applied to the switching module 110 minus a multiplication result of the voltage level of the rectified power applied to the switching module 110 and a preset coefficient. According to an embodiment, the controller 140 may perform scaling of the entire duty ratio or allow each of the switching elements $M_1$ and $M_2$ to be at an Off-state by multiplying the duty ratio calculated by adding the preset offset by a preset coefficient.

That is, when the voltage level of the rectified power source with time is provided in the form of a sine wave that increases, and at the highest point, deceases, the duty ratio may form a parabolic curve that is concave downward.

Accordingly, the time when both the first switching element $M_1$ and the second switching element $M_2$ are at an On-state may have an appearance of alternately decreasing and increasing with time. That is, when the voltage level V_in of the rectified power with time is provided in the form of a sine wave that increases, and at the highest point, decreases, the time when both the first switching element $M_1$ and the second switching element $M_2$ are at an On-state may be shortest at the point where the voltage level V_in of the rectified power reaches the highest point.

Figure 14:
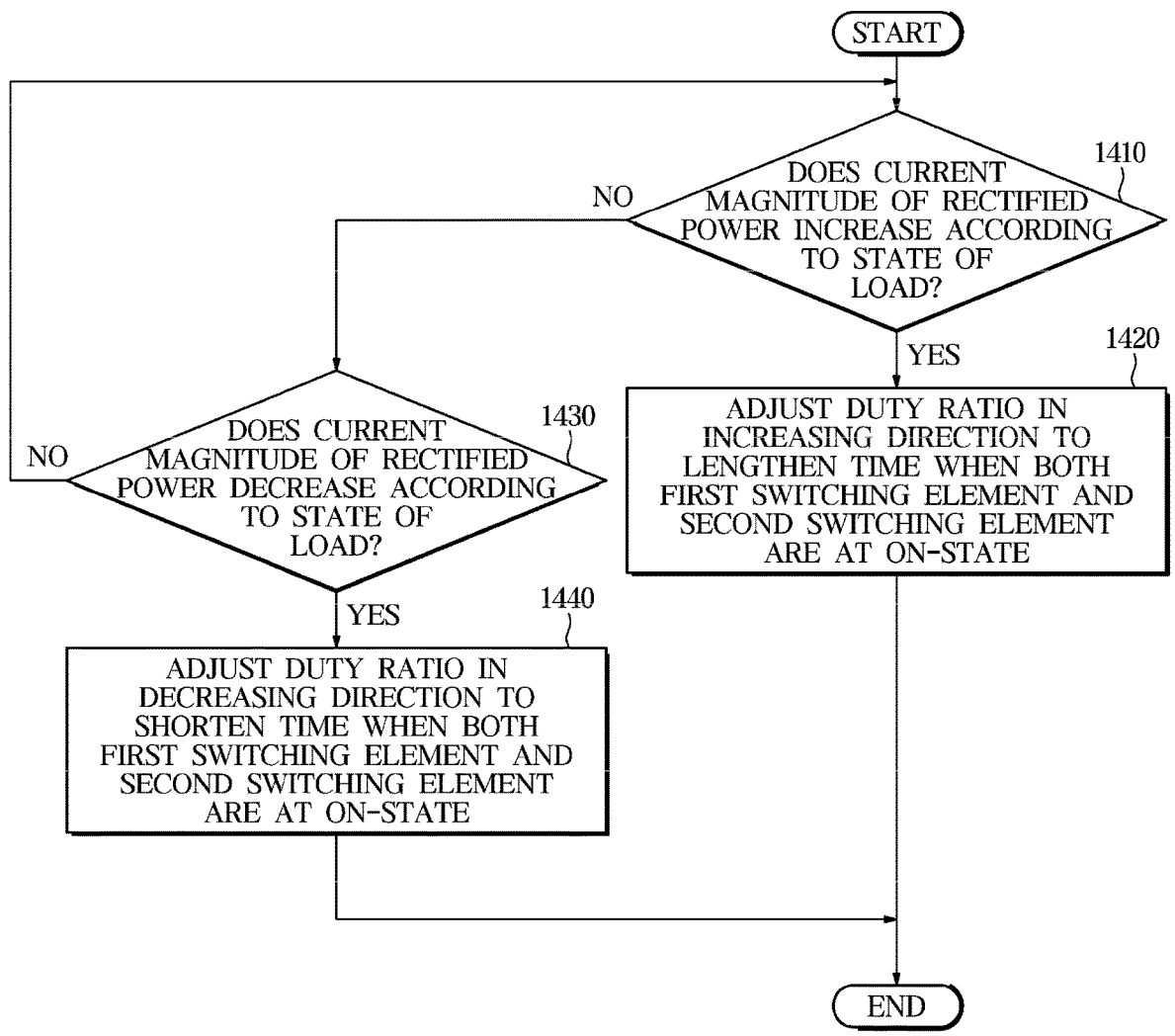
FIG. 14 is a flowchart showing a method of controlling a power supply according to an embodiment, which shows adjustment of a duty ratio according to a current magnitude of a rectified power.

FIG. 14 is a flowchart showing a method of controlling the power supply 10 according to the embodiment, which shows adjustment of a duty ratio according to a current magnitude of rectified power.

Referring to FIG. 14, the power supply 10 according to the embodiment, when the current magnitude of the rectified power increases according to the state of the load (YES in operation 1410), may adjust the duty ratio in a direction that the duty ratio increases to lengthen the time when both the first switching element $M_1$ and the second switching element $M_2$ are at an On-state (1420)

In addition, the power supply 10 according to the embodiment, when the current magnitude of the rectified power does not increase according to the state of the load (NO in operation 1410) and decreases according to the state of the load (YES in operation 1430), may adjust the duty ratio in a direction that the duty ratio decreases to shorten the time when both the first switching element $M_1$ and the second switching element $M_2$ are at an On-state (1440).

In detail, the controller 140 may adjust the duty ratio of each of the first switching element $M_1$ and the second switching element $M_2$ by adding a preset offset to a value of the current magnitude of the rectified power applied to the switching module 110 minus a multiplication result of the voltage level of the rectified power applied to the switching module 110 and a preset coefficient. According to an embodiment, the controller 140 may perform scaling of the entire duty ratio or allow each of the switching elements $M_1$ and $M_2$ to be at an Off-state by multiplying the duty ratio calculated by adding the preset offset by a preset coefficient.

The load to which an output voltage is applied by the power supply 10 may have a resistance whose magnitude greatly varies with an operation mode. For example, when a device provided with the power supply 10 is converted from an operating mode to a standby mode, the magnitude of resistance of the load may be increased, and in such a light load situation, the current magnitude I_in of the rectified power may decrease to I_in'.

In this case, the controller 140 may adjust the duty ratio in a direction that the duty ratio decreases to shorten the time when both the first switching element $M_1$ and the second switching element $M_2$ are at an On-state, and consequently, the degree to which the duty ratio is concave downward may increase.

In addition, when the device provided with the power supply 10 is converted from the standby mode to the operating mode, the resistance magnitude of the load may be lowered, and in such a heavy load situation, the current magnitude I_in' of the rectified power may be increased to I_in.

In this case, the controller 140 may adjust the duty ratio in a direction that the duty ratio increases to lengthen the time when both the first switching element $M_1$ and the second switching element $M_2$ are at an On-state, and consequently, the degree to which the duty ratio is concave downward is reduced.

Figure 15:
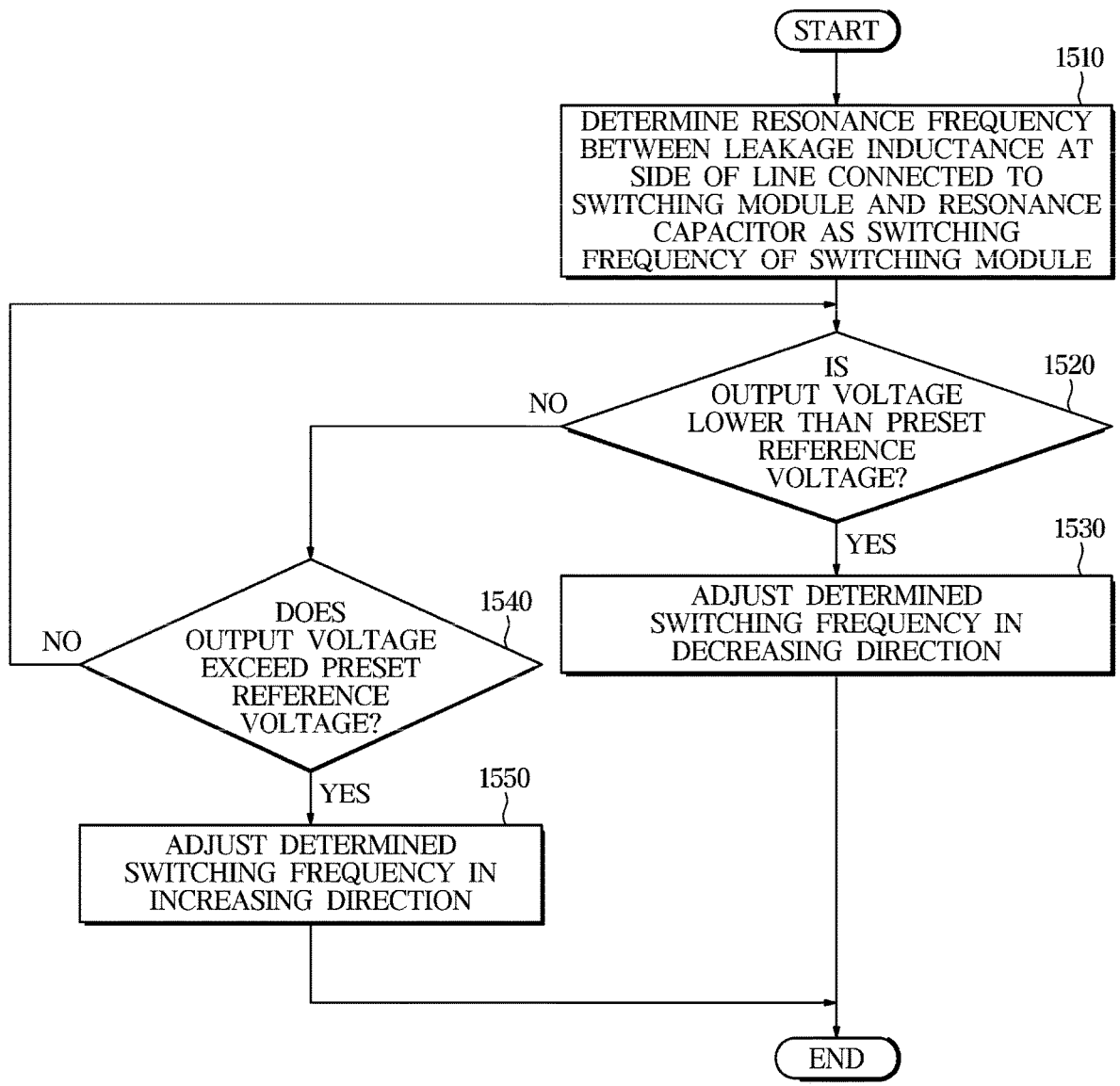
FIG. 15 is a flowchart showing a method of controlling a power supply according to an embodiment, which shows adjustment of the switching frequency of a switching module.

FIG. 15 is a flowchart showing a method of controlling the power supply 10 according to the embodiment, which shows adjustment of the switching frequency of the switching module 110.

Referring to FIG. 15, the power supply 10 according to the embodiment may determine a resonance frequency between the leakage inductance Lp_leak at the side of the line connected to the switching module 110 and the resonance capacitor $C_r$ as the switching frequency of the switching module 110 (1510).

In this case, when the output voltage is lower than a preset reference voltage (YES in operation 1520), the power supply 10 according to the embodiment may adjust the determined switching frequency in a direction that the determined switching frequency decreases (1530).

In addition, when the output voltage is not lower than the preset reference voltage (NO in operation 1520) and exceeds the preset reference voltage (YES in operation 1540), the power supply according to the embodiment 10 may adjust the determined switching frequency in a direction that the determined switching frequency increases (1550).

That is, the controller 140 may adjust the gain between the voltage $V_s$ of the first power applied from the switching module 110 to the transformer 120 and the output voltage by adjusting the switching frequency.

In detail, the controller 140 may increase the gain between the voltage $V_s$ of the first power applied from the switching module 110 to the transformer 120 and the output voltage by lowering the switching frequency of the switching module 110, and may reduce the gain between the voltage $V_s$ of the first power applied from the switching module 110 to the transformer 120 and the output voltage by increasing the switching frequency of the switching module 110.

Accordingly, even when the peak voltage of the AC power input to the power supply 10 varies, the power supply 10 adjusts the switching frequency of the switching module 110, to thereby adjust the gain between the voltage $V_s$ of the first power output from the switching module 110 1 and the output voltage and allow the output voltage to be adjusted to follow the preset reference voltage.

Figure 16:
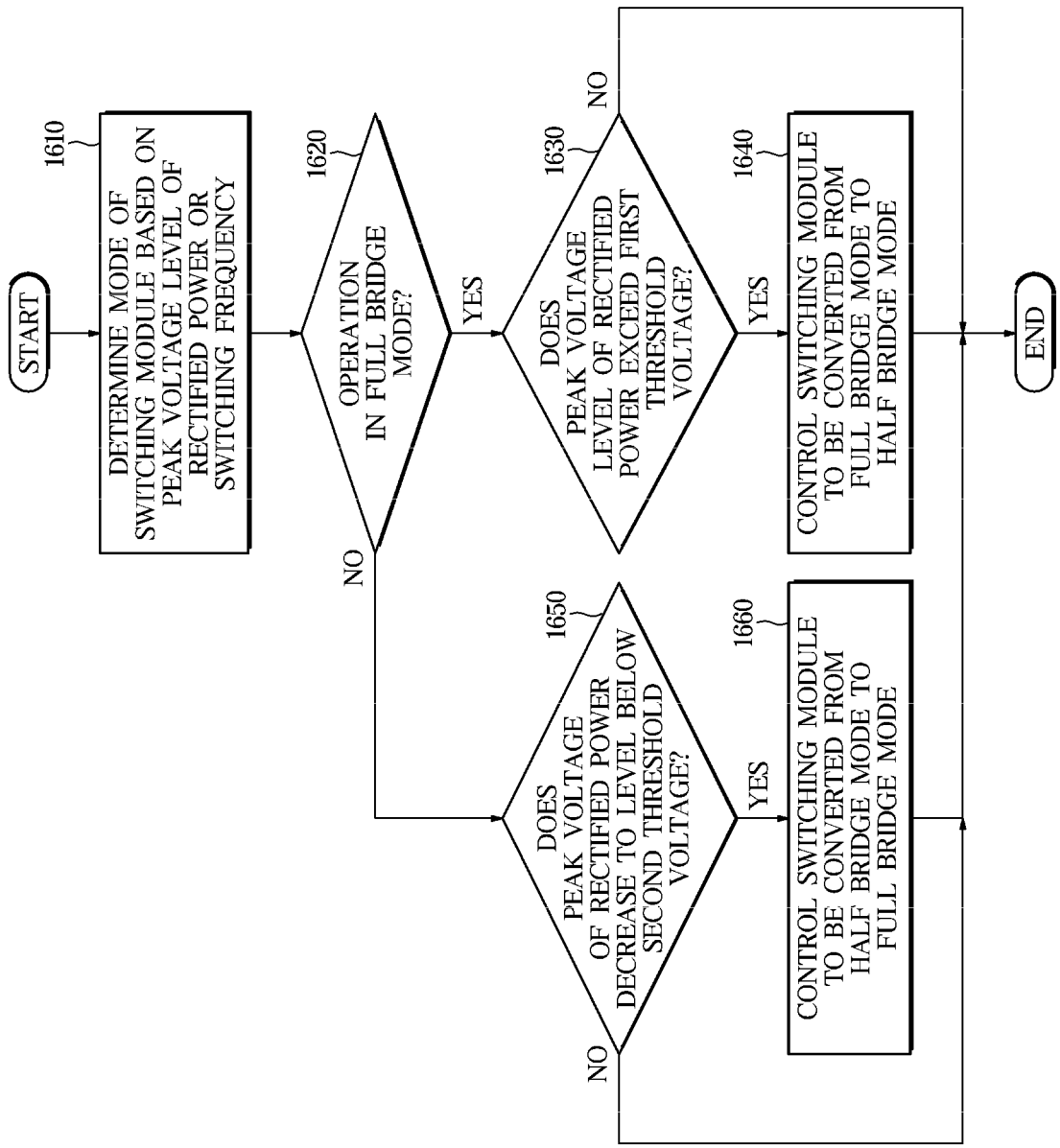
FIG. 16 is a flowchart showing a method of controlling a power supply according to an embodiment, which shows conversion of an operation mode of a switching module.

FIG. 16 is a flowchart showing a method of controlling the power supply 10 according to the embodiment, which shows conversion of an operation mode of the switching module 110.

Referring to FIG. 16, the power supply 10 according to the embodiment may determine a mode of the switching module 110 based on the level of the peak voltage of the rectified power or the switching frequency (1610).

The power supply 10 according to the embodiment, when the switching module 110 operates in a full bridge mode (YES in operation 1620), and the level of the peak voltage of the rectified power increases to exceed a first threshold voltage (YES in operation 1630), may control the switching module 110 to be converted from the full bridge mode to the half bridge mode (1640).

In addition, the power supply 10 according to the embodiment, when the switching module 110 does not operate in the full-bridge mode (NO in operation 1620) and the peak voltage $V_{\_peak}$ of the rectified power decreases to a level below a second threshold voltage (YES in operation 1650), may control the switching module 110 to be converted from the half bridge mode to the full bridge mode (1660).

That is, the controller 140 according to the embodiment may control the switching module 110 to operate in a full bridge mode in which the fifth switching element $M_5$ is in phase with the fourth switching element $M_4$ and the sixth switching element $M_6$ is in phase with the third switching element $M_3$ or a half bridge mode in which the fifth switching element $M_5$ is at an Off-state and the sixth switching element $M_6$ is at an On-state, based on the peak voltage level of the rectified power or the switching frequency.

That is, when the peak voltage $V_{\_peak}$ of the rectified power is low, the controller 140 allows the switching module 110 to operate in the full bridge mode such that the whole peak voltage $V_{\_peak}$ of the rectified power is applied to the switching module 110. In addition, when the peak voltage $V_{\_peak}$ of the rectified power is high, the controller 140 allows the switching module 110 to operate in the half-bridge mode such that a half of the peak voltage $V_{\_peak}$ of the rectified power is applied to the switching module 110.

In other words, the controller 140 may allow the output voltage to follow a preset reference voltage by changing the mode of the switching module 110 According to the level of the peak voltage $V_{\_peak}$.

In this case, the controller 140 according to an embodiment, when the switching module 110 operates in the full bridge mode and the level of the peak voltage $V_{\_peak}$ of the rectified power increases to exceed a first threshold voltage (e.g., 260V), may control the switching module 110 to be converted from the full bridge mode to the half bridge mode.

In addition, the controller 140 according to an embodiment when the switching module 110 operates in the half-bridge mode and the level of the peak voltage $V_{\_peak}$ of the rectified power decreases to a level below a second threshold voltage (e.g., 220V), may control the switching module 110 to be converted from the half bridge mode to the full bridge mode.

That is, the controller 140 may adaptively convert the mode of the switching module 110 as the peak voltage $V_{\_peak}$ of the rectified power varies.

In this case, in order to add hysteresis characteristics to the mode conversion, the controller 140 may set the threshold voltage (for example, 260V) serving as a criterion for mode switching when the peak voltage $V_{\_peak}$ increases to be different from the threshold voltage (for example, 220V) serving as a criterion for mode conversion when the peak voltage $V_{\_peak}$ decreases.

Such a configuration may prevent the mode conversion from constantly occurring with fluctuation of the peak voltage $V_{\_peak}$ at a conversion boundary between the full bridge mode and the half bridge mode, and remove unstable voltage regulation characteristics due to constant mode conversions.

As described above, the power supply 10 according to the embodiment includes the switching module 110 that includes the plurality of switching elements $M_3$, $M_4$, $M_5$, and $M_6$ and receives the rectified power, the transformer 120 that receives first power from the switching module 110 and converts the first power, and the outputter 130 that includes the first switching element $M_1$ and the second switching element $M_2$ and receives the converted first power from the transformer 120 and outputs an output voltage that follows a preset reference voltage.

In this case, the controller 140 of the power supply 10 may control the switching module 110 to operate in one of the full bridge mode or the half bridge mode based on the peak voltage of the rectified power. That is, the controller 140 may change the mode of the switching module 110 according to the level of the peak voltage $V_{\_peak}$ such that the output voltage follows a preset reference voltage.

In addition, the controller 140 of the power supply 10 may adjust the switching frequency of the switching module 110 based on the output voltage. That is, the controller 140 may adjust the switching frequency of the switching module 110, to adjust the gain between the voltage $V_s$ of the first power applied from the switching module 110 to the transformer 120 and the output voltage and allow the output voltage to follow a preset reference voltage.

In addition, the controller 140 of the power supply 10 may control switching of each of the first switching element $M_1$ and the second switching element $M_2$ based on the output voltage of the outputter 130.

That is, the controller 140 may control switching of the first switching element $M_1$ and the second switching element $M_2$ based on the switching frequency of the switching module 110 adjusted according to the output voltage of the outputter 130, and adjust the duty ratio of each of the first switching element $M_1$ and the second switching element $M_2$ based on the rectified power. In this way, the controller 140 may adjust the power factor in the rectified power applied to the switching module 110 while allowing the output voltage to follow a preset reference voltage, and also reduce a free-wheeling diode loss in each of the first switching element $M_1$ and the second switching element $M_2$.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the electronic device and the power supply according to the embodiment can provide a converter with a power factor correction function without including a separate circuit configuration for correcting a power factor in the converter, thereby omitting a plurality of elements for correcting a power factor and thus reducing the volume of the power supply and heat generation.

Although embodiments have been described for illustrative purposes, those skilled in the art will appreciate that various modifications, additions and substitutions are possible, without departing from the scope and spirit of the disclosure. These modifications should also be understood to fall within the scope of the disclosure.

What is claimed is:

1. A power supply comprising:
 a switching module which comprises a plurality of switching elements and is configured to receive rectified power;
 a transformer configured to receive first power from the switching module and transform the first power;
 an outputter which comprises a first switching element and a second switching element, and is configured to receive the transformed first power from the transformer and output an output voltage that follows a preset reference voltage; and
 a controller configured to control the switching module to operate in one from among a full bridge mode and a half bridge module based on a peak voltage of the rectified power, adjust a switching frequency of the switching module based on the output voltage, control switching of each of the first switching element and the second switching element based on the output voltage, and adjust a duty ratio of each of the first switching element and the second switching element based on the rectified power.

2. The power supply of claim 1, wherein the controller is further configured to reduce the duty ratio to shorten a time in which both the first switching element and the second switching element are at an On-state based on a level of voltage of the rectified power increasing over time, and increase the duty ratio to lengthen the time in which both the first switching element and the second switching element are at an On-state based on the level of the voltage of the rectified power decreasing over time.

3. The power supply of claim 1, wherein the controller is further configured to increase the duty ratio to lengthen a time in which both the first switching element and the second switching element are at an On-state based on a magnitude of current of the rectified power increasing according to a state of a load, and decrease the duty ratio to shorten the time in which both the first switching element and the second switching element are at an On-state based on the magnitude of the current of the rectified power decreasing according to the state of the load.

4. The power supply of claim 1, wherein the controller is further configured to adjust the duty ratio of each of the first switching element and the second switching element by adding a preset offset to a difference between a current magnitude of the rectified power and a value obtained by multiplying a voltage level of the rectified power by a preset coefficient.

5. The power supply of claim 1, wherein the transformer comprises a resonance capacitor provided on a line connected between the transformer and the switching module, and
 wherein the controller is further configured to identify a resonance frequency between a leakage inductance at a side of the line connected to the switching module and the resonance capacitor as the switching frequency of the switching module.

6. The power supply of claim 5, wherein the controller is further configured to decrease the identified switching frequency based on the output voltage output through the outputter becoming lower than the preset reference voltage, and increase the identified switching frequency based on the output voltage output through the outputter becoming higher than the preset reference voltage.

7. The power supply of claim 1, wherein the switching module comprises a first pair of switching elements connected in series to each other and a second pair of switching elements connected in parallel with each other,
 wherein the first pair of switching elements comprises a third switching element and a fourth switching element,
 the second pair of switching elements comprises a fifth switching element and a sixth switching element connected in parallel to the first pair of switching elements, and
 wherein the controller is further configured to control the third switching element and the fourth switching element such that the third switching element and the fourth switching element are alternately in an On-state based on the switching frequency of the switching module.

8. The power supply of claim 7, wherein the controller is further configured to control the first switching element to an On-state at a point in which the third switching element is converted from an On-state to an Off-state, and control the second switching element to an On-state at a point in which the fourth switching element is converted from an On-state to an Off-state.

9. The power supply of claim 7, wherein the controller is further configured to control, based on the switching module being controlled to operate in the full bridge mode, the fifth switching element to be in phase with the fourth switching element and the sixth switching element to be in phase with the third switching element, and control, based on the switching module being controlled to operate in the half bridge mode, the fifth switching element to an Off-state and the sixth switching element to an On-state.

10. The power supply of claim 9, wherein the controller is further configured to control, based on the level of the peak voltage of the rectified power increasing to a level exceeding a first threshold voltage, the switching module to convert from the full bridge mode to the half bridge mode, and control, based on the level of the peak voltage of the rectified power decreasing to a level below a second threshold voltage, the switching module to convert from the half bridge mode to the full bridge mode.

11. The power supply of claim 9, wherein the controller is further configured to control, based on the switching frequency of the switching module increasing to a level exceeding a first threshold frequency, the switching module to convert from the full bridge mode to the half bridge mode, and control, based on the switching frequency of the switching module decreasing to a level below a second threshold frequency, the switching module to convert from the half bridge mode to the full bridge mode.

12. The power supply of claim 1, wherein the outputter further comprises:
 a first diode that is connected to the first switching element by a first line; and
 a second diode that is connected to the second switching element by a second line,
 wherein the first diode and the second diode are connected in parallel,
 wherein the first switching element and the second switching element are connected in parallel, and wherein the outputter is connected to the transformer through a first connection point interposed between the first diode and the first switching element and a second connection point interposed between the second diode and the second switching element.

13. An electronic device comprising:
a load configured to receive power and perform an operation; and
a power supply configured to supply the power to the load,
wherein the power supply comprises:
a switching module which comprises a plurality of switching elements and is configured to receive rectified power;
a transformer configured to receive first power from the switching module and transform the first power;
an outputter comprising a first switching element and a second switching element, and configured to receive the transformed first power from the transformer and output an output voltage that follows a preset reference voltage; and
a controller configured to control the switching module to operate in one from among a full bridge mode and a half bridge module based on a peak voltage of the rectified power, adjust a switching frequency of the switching module based on the output voltage, control switching of each of the first switching element and the second switching element based on the output voltage, and adjust a duty ratio of each of the first switching element and the second switching element based on the rectified power.

14. The electronic device of claim 13, wherein the controller is further configured to adjust the duty ratio of each of the first switching element and the second switching element by adding a preset offset to a difference between a current magnitude of the rectified power and a value obtained by multiplying a voltage level of the rectified power by a preset coefficient.

15. The electronic device of claim 13, wherein the transformer comprises a resonance capacitor provided on a line connected between the transformer and the switching module, and
wherein the controller is further configured to identify a resonance frequency between a leakage inductance at a side of the line connected to the switching module and the resonance capacitor as the switching frequency of the switching module.

16. The electronic device of claim 15, wherein the controller is further configured to decrease the identified switching frequency based on the output voltage output through the outputter becoming lower than the preset reference voltage, and increase the identified switching frequency based on the output voltage output through the outputter becoming higher than the preset reference voltage.

17. The electronic device of claim 13, wherein the switching module comprises a first pair of switching elements connected in series to each other and a second pair of switching elements connected in parallel with each other,
wherein the first pair of switching elements comprises a third switching element and a fourth switching element,
wherein the second pair of switching elements comprises a fifth switching element and a sixth switching element connected in parallel to the first pair of switching elements, and
wherein the controller is further configured to control the third switching element and the fourth switching element such that the third switching element and the fourth switching element are alternately in an On-state based on the switching frequency of the switching module.

18. The electronic device of claim 17, wherein the controller is further configured to control the first switching element to an On-state at a point in which the third switching element is converted from an On-state to an Off-state, and control the second switching element to an On-state at a point in which the fourth switching element is converted from an On-state to an Off-state.

19. The electronic device of claim 17, wherein the controller is further configured to control, based on the switching module being controlled to operate in the full bridge mode, the fifth switching element to be in phase with the fourth switching element and the sixth switching element to be in phase with the third switching element, and control, based on the switching module being controlled to operate in the half bridge mode, the fifth switching element to an Off-state and the sixth switching element to an On-state.

20. The electronic device of claim 13, wherein the outputter comprises:
a first diode that is connected to the first switching element by a first line; and
a second diode that is connected to the second switching element by a second line,
wherein the first diode and the second diode are connected in parallel,
wherein the first switching element and the second switching element are connected in parallel, and
wherein the outputter is connected to the transformer at a first connection point interposed between the first diode and the first switching element and a second connection point interposed between the second diode and the second switching element.

* * * * *